(12) United States Patent
Kuntz et al.

(10) Patent No.: US 11,390,042 B2
(45) Date of Patent: Jul. 19, 2022

(54) METHOD AND APPARATUS FOR THERMALLY JOINING THERMOPLASTIC FIBER COMPOSITE COMPONENTS, AND COVER FOR A PRESSURIZATION DEVICE SUITABLE FOR THIS PURPOSE

(71) Applicant: Premium Aerotec GmbH, Augsburg (DE)

(72) Inventors: Julian Kuntz, Augsburg (DE); Thomas Geipel, Koenigsbrunn (DE)

(73) Assignee: Premium Aerotec GmbH, Augsburg (DE)

( * ) Notice: Subject to any disclaimer, the term of this patent is extended or adjusted under 35 U.S.C. 154(b) by 441 days.

(21) Appl. No.: 16/298,635

(22) Filed: Mar. 11, 2019

(65) Prior Publication Data

US 2019/0283170 A1 Sep. 19, 2019

(30) Foreign Application Priority Data

Mar. 13, 2018 (DE) ...................... 10 2018 002 011.9

(51) Int. Cl.
*H05B 3/03* (2006.01)
*B29C 65/02* (2006.01)
(Continued)

(52) U.S. Cl.
CPC ...... *B29C 66/0342* (2013.01); *B29C 43/3642* (2013.01); *B29C 65/02* (2013.01);
(Continued)

(58) Field of Classification Search
CPC ......... B29C 65/18; B29C 65/30; B29C 65/04; B29C 65/22; B29C 66/81455;
(Continued)

(56) References Cited

U.S. PATENT DOCUMENTS 4,673,450 A * 6/1987 Burke ................. B29C 66/7212
156/153
5,116,216 A * 5/1992 Cochran ................. B29C 70/44
156/286
(Continued)

FOREIGN PATENT DOCUMENTS

DE 1908987 A1 9/1969
DE 10 2015 005 407 A1 11/2016
(Continued)

OTHER PUBLICATIONS

European Search Report for Application No. 19153251.4 dated Jul. 18, 2019.
(Continued)

*Primary Examiner* — Scott W Dodds
(74) *Attorney, Agent, or Firm* — Jenkins, Wilson, Taylor & Hunt, P.A.

(57) ABSTRACT

A method for thermally joining thermoplastic fiber composite components, including jointly covering thermoplastic fiber composite components to be joined, at least in the region of a joining zone, with a pressurization arrangement, which is flexible, at least in some section or sections, and extensive pressurization of thermoplastic fiber composite components to be joined by the pressurization arrangement, with the result that the fiber composite components are pressed against one another, at least in the joining zone. The fiber composite components are welded in the joining zone during pressurization. The pressurization is maintained by the pressurization arrangement until the joining zone solidifies. A cover is also disclosed, in particular a mold or diaphragm, for a pressurization device for thermally joining thermoplastic fiber composite components, and an apparatus for thermally joining thermoplastic fiber composite components.

1 Claim, 25 Drawing Sheets

(51) Int. Cl.
| | |
|---|---|
| *B29C 65/00* | (2006.01) |
| *B29C 65/04* | (2006.01) |
| *B29C 65/34* | (2006.01) |
| *B29C 65/16* | (2006.01) |
| *B29C 43/36* | (2006.01) |
| *B29C 65/36* | (2006.01) |
| *B29C 65/08* | (2006.01) |
| *H05B 3/00* | (2006.01) |
| *B23K 103/00* | (2006.01) |
| *B23K 103/16* | (2006.01) |
| *B29K 701/12* | (2006.01) |

(52) U.S. Cl.
CPC .............. *B29C 65/04* (2013.01); *B29C 65/08* (2013.01); *B29C 65/16* (2013.01); *B29C 65/34* (2013.01); *B29C 65/3468* (2013.01); *B29C 65/36* (2013.01); *B29C 65/3668* (2013.01); *B29C 66/00145* (2013.01); *B29C 66/1122* (2013.01); *B29C 66/21* (2013.01); *B29C 66/345* (2013.01); *B29C 66/349* (2013.01); *B29C 66/43* (2013.01); *B29C 66/721* (2013.01); *B29C 66/7212* (2013.01); *B29C 66/73921* (2013.01); *B29C 66/81413* (2013.01); *B29C 66/81425* (2013.01); *B29C 66/81455* (2013.01); *B29C 66/81871* (2013.01); *B29C 66/81881* (2013.01); *B29C 66/836* (2013.01); *H05B 3/0023* (2013.01); *B23K 2103/172* (2018.08); *B23K 2103/42* (2018.08); *B29C 66/72321* (2013.01); *B29C 66/82661* (2013.01); *B29C 66/91655* (2013.01); *B29K 2701/12* (2013.01); *H05B 3/0004* (2013.01)

(58) Field of Classification Search
CPC ........ B29C 66/82661; B29C 66/73921; B29C 66/91655; H05B 3/004; H05B 3/0023
See application file for complete search history.

(56) References Cited

U.S. PATENT DOCUMENTS

| | | | |
|---|---|---|---|
| 5,591,291 | A | 1/1997 | Blackmore |
| 8,101,040 | B2 * | 1/2012 | Shibata ............ B29C 66/91421 156/273.9 |
| 9,610,654 | B1 | 4/2017 | Matsen et al. |
| 2005/0252608 | A1* | 11/2005 | MacDonald ........... B29C 66/43 156/273.9 |
| 2010/0212823 | A1 | 8/2010 | Shibata et al. |
| 2014/0154494 | A1 | 6/2014 | Kato et al. |
| 2016/0318239 | A1 | 11/2016 | Silvanus et al. |
| 2017/0129163 | A1 | 5/2017 | Soccard |
| 2019/0016039 | A1 | 1/2019 | Drees et al. |

FOREIGN PATENT DOCUMENTS

| | | |
|---|---|---|
| DE | 10 2016 101 641 A1 | 8/2017 |
| DE | 10 2016 111 074 A1 | 12/2017 |
| GB | 1 184 328 A | 3/1970 |
| GB | 2 322 823 A | 9/1998 |
| JP | H04-173232 A | 6/1992 |

OTHER PUBLICATIONS

German Office Action for Application No. 10 2018 002 011.9 dated Apr. 24, 2019.

European Search Report for Application No. 19153251.4 dated Oct. 21, 2019.

* cited by examiner

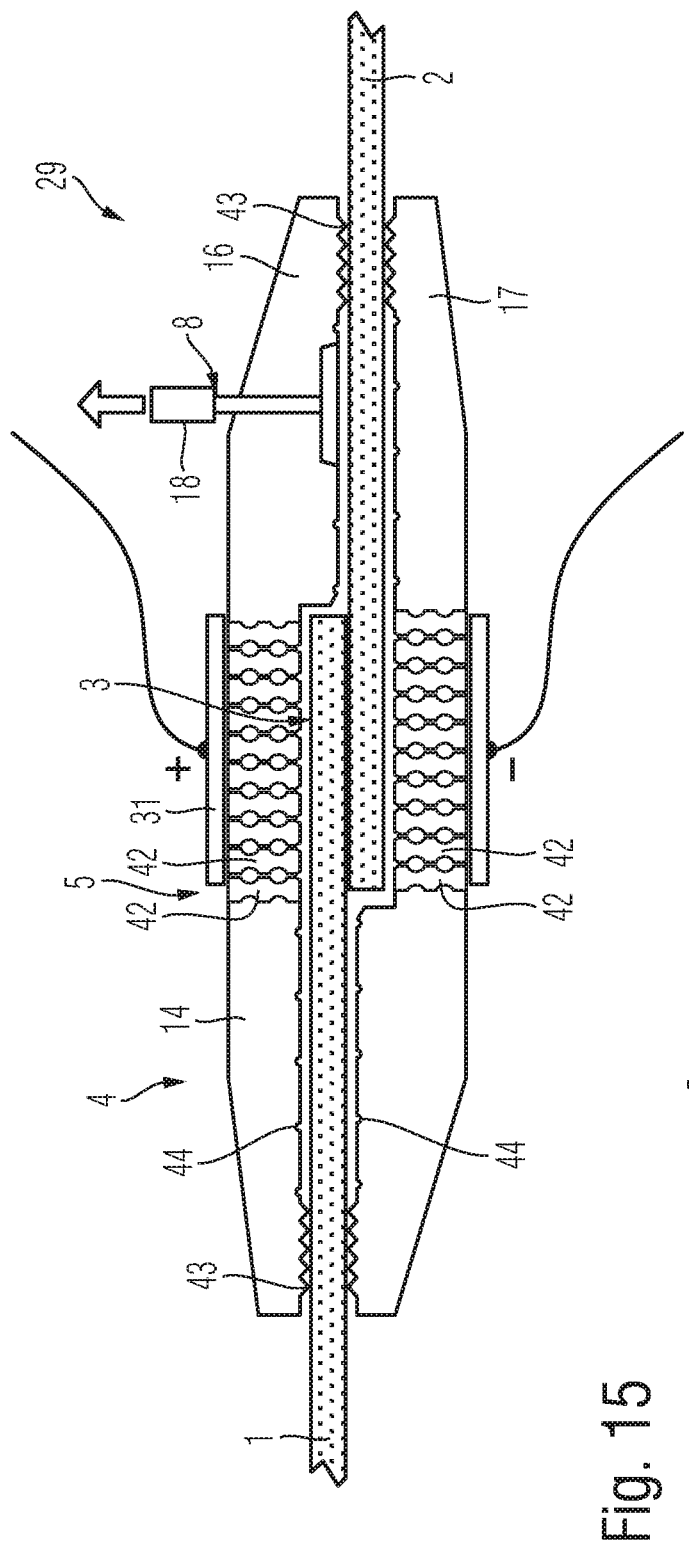
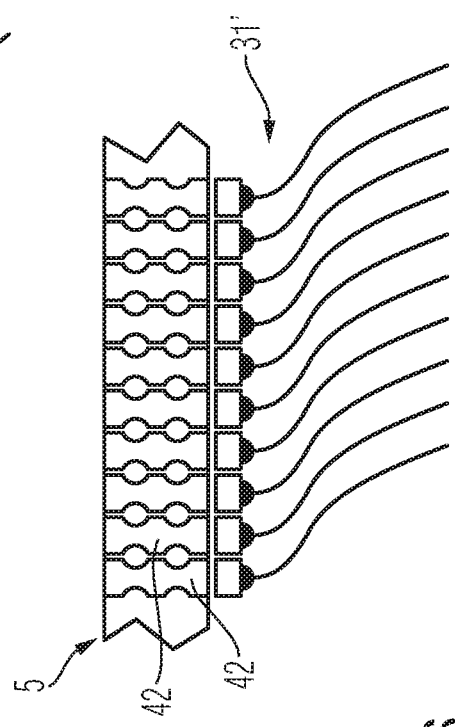
Fig. 15
Fig. 16

METHOD AND APPARATUS FOR THERMALLY JOINING THERMOPLASTIC FIBER COMPOSITE COMPONENTS, AND COVER FOR A PRESSURIZATION DEVICE SUITABLE FOR THIS PURPOSE

CROSS-REFERENCE TO RELATED APPLICATION

This application claims priority to German patent application DE 10 2018 002 011.9 filed Mar. 13, 2018, the entire disclosure of which is incorporated by reference herein.

TECHNICAL FIELD

The disclosure herein relates to a method for thermally joining thermoplastic fiber composite components, to a cover, in particular mold or diaphragm, for a pressurization device for thermally joining thermoplastic fiber composite components by such a method, and to an apparatus for thermally joining thermoplastic fiber composite components in accordance with a method of this kind.

BACKGROUND

There is a very wide variety of approaches to welding thermoplastic fiber composite components. DE 10 2015 005 407 A1, for example, describes a method for welding fiber-reinforced thermoplastics by friction stir welding. In another method for welding thermoplastic fiber composite components, which is known internally to the applicant, spot welding is carried out with a welding head, wherein the welding head itself exerts a contact pressure on the welding location and, after welding, remains at the welding point until the material solidifies again. In yet another method for thermally joining thermoplastic fiber composite components, which is known internally to the applicant, a contact pressure roller is guided after the welding head, compressing the material precisely at the time of solidification. In yet another method known internally to the applicant, use is made of solid clamping/pressure molds made of metal, which precisely replicate the component contour on both sides.

SUMMARY

Given this background situation, it is the underlying object of the disclosure herein to provide an improved method and an improved apparatus as well as an improved cover for thermally joining thermoplastic fiber composite components.

According to the disclosure herein, this object is achieved by a method, by a cover, and/or by an apparatus having features disclosed herein.

Accordingly, what is provided is:

A method for thermally joining thermoplastic fiber composite components, comprising: jointly covering thermoplastic fiber composite components to be joined, at least in the region of a joining zone, with a pressurization arrangement, which is flexible, at least in some section or sections; extensive pressurization of thermoplastic fiber composite components to be joined by the pressurization arrangement, with the result that the fiber composite components are pressed against one another, at least in the joining zone; welding the fiber composite components in the joining zone during pressurization; and maintaining the pressurization by the pressurization arrangement until the joining zone solidifies.

A cover, in particular mold or diaphragm, for a pressurization device for thermally joining thermoplastic fiber composite components, in particular by a method according to the disclosure herein, wherein the cover is of substantially flat and flexible design and is designed to be electrically conductive normally with respect to an extent of a main surface thereof and is of electrically insulating design in the directions of extent of the main surface thereof.

Apparatus for thermally joining thermoplastic fiber composite components, in particular in accordance with a method according to the disclosure herein, having: a pressurization arrangement, which is flexible, at least in some section or sections, for jointly covering, at least in the region of a joining zone, thermoplastic fiber composite components to be joined and applying pressure to thermoplastic fiber composite components to be joined, with the result that the fiber composite components to be joined are pressed against one another, at least in the joining zone, and a welding device (e.g., a welder) for welding the fiber composite components in the joining zone, wherein the pressurization arrangement and the welding device are designed in such a way that thermoplastic fiber composite components can be welded in a pressurized state in the joining zone and the pressurization can be maintained by the pressurization arrangement, in particular independently of the welding device, until the joining zone solidifies.

The concept underlying the disclosure herein consists in or comprises providing extensive pressure on the fiber composite components to be joined by a pressurization arrangement which is flexible, at least in some section or sections, this pressure being maintained during and, especially, also after welding, independently of a welding device or a welding process. During the welding of fiber-reinforced thermoplastics, it is thus possible for mating parts to be pressed uniformly onto one another by the joining surface. Moreover, a tendency of the fiber plies to expand in the thickness direction as the matrix softens is counteracted in an effective manner. This prevents additional volume from being filled with air, thus avoiding the formation of pores.

According to the disclosure herein, the mating parts are compressed not only at the moment when heat is introduced to melt the matrix. On the contrary, the pressure is maintained even after this, until the matrix of the fiber composite components cools again and becomes solid or solidifies. It is particularly advantageous if, according to the disclosure herein, the contact pressure is applied permanently or statically, even after welding, without large installations and without fixed clamping molds. Directly after heating the material, a welding head can therefore move on further since it is no longer required during the cooling process.

For this purpose, the pressurization device preferably has a flexible cover, which transmits a pressure in a uniformly distributed manner to the joining zone when pressure is applied. This flexible cover can be designed as a flexible diaphragm or flexible mold. Such a cover can be provided on one side or on both sides in the joining zone.

In particular, a cover for a resistance welding method is a cover according to the disclosure herein, which is designed to be electrically conductive normally with respect to an extent of a main surface thereof, i.e. the thickness direction thereof, and is of electrically insulating design in the directions of extent of the main surface thereof, i.e. parallel to the surface thereof. For inductive welding methods, covers which are permeable for magnetic fields or, for laser welding methods, covers which are transparent for laser beams or, for ultrasonic welding methods, covers that transmit ultrasound are furthermore conceivable. The flexible cover is designed in such a way as to allow welding in the state of the joining zone in which it is being subjected to pressure by the cover and then to hold the pressure independently of a welding device. Thus, there is no need for fixed clamping molds, which must generally fit exactly and in which the pressure is not applied uniformly in the event of tolerance deviations in the component or in the event of sagging of the clamping mold and which must furthermore be produced specifically for each component. Since such molds would have to divert all the pressure forces applied over the entire length of the joining zone around the component and require a high stiffness for this purpose, they would in some cases be very massive and cumbersome. Thus, according to the disclosure herein, the handling of a pressurization arrangement is improved, especially for welding in locations which are difficult to access, e.g. for applications in aircraft assembly.

The solidification of the joining zone should be taken to mean at least predominant solidification of thermoplastic matrix of thermoplastic fiber composite components to be joined. For example, the pressurization is maintained until the temperature of the joining zone falls below the glass transition temperature of the matrix material.

Extensive pressurization should preferably be taken to mean pressurization in a surface region which is larger, preferably many times larger, than a heat influence zone around a weld seam to be produced. This is preferably a surface segment of the components to be joined which extends beyond the joining zone. By virtue of the flexibility of the pressurization arrangement, which is preferably provided at least in the region of the joining zone, the applied pressure is distributed uniformly over the surface of the joining zone. A corresponding pressurization arrangement, which is flexible, at least in some section or sections, can be designed for extensive pressurization by a vacuum or of magnetism, for example.

The joining zone should be taken to mean a region of the fiber composite components which is to be connected materially. In particular, it can be a joint region, e.g. an overlapping joint region, of the components to be joined.

Thermoplastic fiber composite components to be joined contain at least one thermoplastic fiber composite component and another component, which is to be welded to the first. Thermoplastic fiber composite components to be joined can also be more than two components, e.g. three or more components.

Advantageous embodiments and developments will become apparent from the further dependent claims and from the description with reference to the figures.

According to a development, the pressurization arrangement contains electric contacts, and the fiber composite components are welded by resistance welding via the electric contacts. The electric contacts form an electric connection between an inner side and an outer side of the pressurization arrangement. In this way, it is possible, for example, to attach welding electrodes of a welding device to the electric contacts from the outside, wherein the contacts transmit a welding current into the joining zone. To minimize the resistance, a contacting aid, e.g. a contact paste, can be provided between the fiber composite components and the contacts. In this way, it is possible to perform a welding process during pressurization by the pressurization arrangement.

According to one embodiment, the electric contacts are arranged along the joining zone and welding is performed continuously or in sections along the joining zone by local application of a welding current to the contacts. At the point where the welding current is applied, which preferably progresses along the joining zone at a predetermined feed rate, the joining zone is slightly melted and/or melted locally and welded under the pressure of the pressurization arrangement. The welding is therefore a progressive process, in particular linear welding, wherein the pressure applied by the pressurization arrangement is maintained steadily, in particular in a manner uniformly distributed over the entire joining zone, during the process. A progressive welding process can thus advantageously be performed under steady-state pressure conditions.

According to one embodiment, the electric contacts are divided into mutually isolated contact sections, wherein a welding current is applied to both sides of the joining zone in respectively opposite contact sections and the welding of the fiber composite components is performed by a current flow in the thickness direction through the fiber composite components. This ensures that it is advantageously impossible for the current flow to propagate sideways into or across other segments, thus allowing more targeted heat input for welding. In this case, welding is performed segment-by-segment or section-by-section along the joining zone.

According to one embodiment, a conductive welding filler material is introduced between thermoplastic fiber composite components to be joined in the joining zone and is connected to the electric contacts. Welding is accordingly performed by applying a welding current to the welding filler material. The welding filler material can be a thermoplastic prepreg layer, for example. In respect of its electric resistance, this is designed in such a way that its conductivity is high enough to conduct the welding current while giving rise to sufficient heat of resistance to weld the fiber composite materials. The welding filler material is furthermore designed to fit easily into the material of the fiber composite components in the joining zone, thus ensuring that a stable and firm joint between the fiber composite components is formed after thermal joining. For this purpose, it can have a similar fiber structure to that of the fiber composite components, for example. It is furthermore conceivable to configure the welding filler material in a manner which prevents delamination, e.g. with mechanical coupling elements, which can engage into the material of the fiber composite components during welding. A particularly firm joint is thus created.

According to a development, the electrodes which make contact with the welding filler material are each arranged at the longitudinal ends, i.e. on the respective short sides of the joining zone in the case of an elongate joining zone. However, arrangements on the long sides of the joining zone are also possible, depending on the configuration of the pressurization arrangement.

In the case of an overlapping joint of the fiber composite components to be joined, the welding filler material on the long sides of the joining zone can be continued beyond the joining zone or beyond the overlap. In this way, reliable melting of the component edges is ensured. A continuous weld is thus achieved, and a notch at the connections between the overlapping component edges is advantageously avoided, and thus the strength is improved.

According to a development, a parting agent, e.g. an adhesive tape with a parting coating, is provided following the filler material extended beyond the overlap. In this way, a region of the fiber composite components to be joined which is melted beyond the joining zone through the filler material is closed off in a defined manner, this improving the seam appearance in particular.

In one embodiment, the welding filler material is surrounded by an electrically non-conductive layer, apart from at the electric contacting surfaces for the introduction of the welding current. In this way, the desired current routing within the welding filler material is ensured. In this case, the non-conductive layer is welding at the same time and is designed in such a way that it does not become conductive, even as the matrix of the fiber composite components to be joined is melted. Glass fiber/thermoplastic prepreg layers are suitable as a material, for example. In particular, the non-conductive layer projects somewhat beyond the edges of the conductive welding filler material in order to provide reliable insulation even at the edges.

According to one embodiment, electrically non-conductive auxiliary inserts are applied adjoining the overlap, preferably on both sides of the overlapping joint, in the region of the component edges, between the respective component and the pressurization arrangement. Here, the welding filler material can be extended partially beyond the auxiliary inserts at the edge of the joining zone. The pressure is preferably also applied to the auxiliary inserts. Here, the auxiliary inserts preferably have an identical thermal conductivity to the material of the fiber composite components. In this way, the welding heat is carried as far as the component edges, allowing a desired complete welding of the edge. For this purpose, it is possible, in particular, for the auxiliary insert to be produced from the same material as the fiber composite components but to be surrounded by a non-conductive medium, e.g. a film.

According to one embodiment, the pressurization arrangement is provided as a magnet arrangement. In this case, pressurization comprises applying magnetic forces to the fiber composite components. Magnetic forces advantageously provide a continuous attraction for the pressurization arrangement, thus enabling the pressurized welding and solidification to be performed under constant pressure conditions. In one embodiment, the magnet arrangement can contain permanent magnets. As an alternative or in addition, the magnet arrangement can contain electromagnets. In a development, the magnets can additionally also be designed or provided as conductive elements for contacting.

According to one embodiment, the pressurization arrangement is provided as a vacuum arrangement. Accordingly, pressurization comprises the application of a vacuum. In this case, the pressurization arrangement contains a flexible airtight cover under which the vacuum is generated. For this purpose, a suction nozzle can be provided on the vacuum arrangement, for example, this being coupled to a vacuum pump. In this way, uniform pressurization over the entire joining zone is advantageously achieved. It is furthermore also possible in this way to cover the components as a whole when required and in this way, on the one hand, to fix them for welding and, on the other hand, to press them against one another. However, the vacuum apparatus is preferably provided only locally around the joining zone. Since the material outside the joining zone remains solid, it is thus advantageously possible to form a seal on the component itself and thus to significantly reduce the effort and the quantity of auxiliary materials. In one embodiment, a flexible cover of the vacuum arrangement can be provided on one side in combination with an inflexible mold arranged on the other, opposite side.

In another embodiment, the flexible cover of the vacuum arrangement can be provided on two sides with two oppositely arranged covers on the fiber composite components to be joined.

A vacuum arrangement and a magnet arrangement can also be combined with one another. It is thus advantageously possible for the pressure to be increased and to be intensified locally by magnets, particularly in the joining zone.

According to one embodiment, the vacuum arrangement has a flexible vacuum diaphragm, which covers a top side of the fiber composite components to be joined. Optionally or in addition, the flexible vacuum diaphragm can also cover a bottom side of the fiber composite components to be joined. Here, the vacuum diaphragm forms at least part of the cover of the pressurization arrangement. By a vacuum, it is advantageously possible to apply a uniform pressure to the fiber composite components.

In one embodiment, a vacuum film bag, the compartment of which is evacuated by a vacuum pump in order to press the mating parts on to one another by atmospheric pressure, is used, for example. The flexible vacuum bag applies the contact pressure in a uniformly distributed manner and can easily be adapted to a very wide variety of component shapes. Component tolerances can thus advantageously be compensated more easily. In another embodiment, it is also possible, for example, to use two film bags in order to provide a corresponding cover on both component sides.

According to one embodiment, the joint covering, by the vacuum arrangement, of the fiber composite components to be joined comprises applying at least one electrically conductive element as an electric contact in the joining zone. The vacuum diaphragm is furthermore connected in an airtight manner to the electrically conductive element. In this way, the electrically conductive element can be applied directly to the fiber composite components precisely in the sections to be welded, in particular an overlapping region, allowing high accuracy of positioning. The airtight connection to the vacuum diaphragm can take place, in particular, following the application of the electrically conductive element.

In one embodiment, it is furthermore conceivable to connect the electrically conductive element first of all airtightly to the vacuum diaphragm and then to apply it in the joining zone.

According to an advantageous development, a plurality of electrically conductive elements is provided as contact sections, which are each separated electrically from one another and connected in an airtight manner. In this way, electric contacts divided into mutually isolated sections can be implemented with a high accuracy of positioning. With contacts divided into sections, the current flow through the joining zone can advantageously be locally controlled. The electrically conductive elements can be metal foil sections or air-impermeable conductive textile sections, for example. The mutually electrically separated airtight connection can be performed by an insulated adhesive tape, for example. In this way, section-by-section welding in a continuous process is made possible, on the one hand, but furthermore the use of heating methods based on current conduction which prepare, assist or implement welding is also made possible.

According to an illustrative embodiment, piece-by-piece use of electrically conductive metal foil as contact sections for the vacuum diaphragm or a vacuum bag can be envisaged. In order to be able to carry out resistance welding by current flow, an electrically insulating film of the vacuum diaphragm is interrupted and replaced with an electrically conductive metal foil connected airtightly thereto in the region of the weld seam or in the regions where the current is to be introduced. Section-by-section conductivity is thus achievable.

According to another embodiment, a diaphragm, which is provided as a cover for the pressurization arrangement and which is designed as a vacuum diaphragm of a vacuum arrangement, is designed to be conductive for electric current only in the thickness direction and not in the direction of the surface. The electric conductivity is thus direction-dependent. An embodiment of this kind is associated with the advantage that the construction of a vacuum arrangement is greatly simplified. In particular, it is thus possible for an entire vacuum bag to be composed of the same material without the risk of short circuits. The diaphragm can be a film which is unidirectionally conductive in the thickness direction or a unidirectionally conductive textile. In particular, it can be a plastic film with metal particles embedded in the direction of current conduction, a silicone mold with metal bars embedded in the direction of current conduction or a synthetic fiber textile with metal threads introduced in the direction of current conduction.

According to one embodiment, the fiber composite components are welded by induction excited from outside the vacuum arrangement. In particular, cooling of the vacuum arrangement, especially external cooling, e.g. by compressed air, is provided in order to avoid overheating or damaging the vacuum arrangement. In this way, it is thereby advantageously possible to freely configure welding patterns from outside the vacuum arrangement without the need for special preparation measures beforehand. Apart from a certain heat resistance, the vacuum arrangement can be provided without special properties here. For example, a cover of the vacuum arrangement can be a plastic film which is cooled from the outside by compressed air nozzles blowing onto the film.

According to another embodiment, the fiber composite components are welded by ultrasound excited from outside the vacuum arrangement and transmitted via the vacuum arrangement. In particular, a sonotrode on the vacuum arrangement is used for this purpose. Cooling of the vacuum arrangement is preferably also provided. In particular, this can be external cooling, e.g. by compressed air. Particularly in the case of a vacuum diaphragm as a vacuum arrangement, it is possible in this way to avoid sticking. The vacuum diaphragm and the sonotrode are designed in such a way here that the vacuum diaphragm transmits or conducts the ultrasound into the joining zone. In the case of a vacuum arrangement designed as a flexible mold, e.g. a silicone mold, the ultrasound can be transmitted from the sonotrode to the component surface in the joining zone via metal bars inserted into the mold. In one embodiment, it is also additionally possible for the metal bars to be designed as magnets of a magnet arrangement.

According to another embodiment, the vacuum arrangement provided is transparent for a predetermined laser radiation. The fiber composite components are welded by a laser beam introduced from outside the vacuum arrangement. In particular, it is possible, here too, for cooling of the vacuum arrangement to be provided, e.g. by compressed air. For this purpose, it is possible, by way of example, for a vacuum film that is at least substantially transparent for the laser radiation used, in particular for predetermined wavelengths, to be employed for the vacuum arrangement.

According to one embodiment of a cover, this can have a vacuum arrangement, wherein pressurization of a component is made possible by a vacuum.

In another embodiment, the cover can contain a magnet arrangement which has integrated magnets. Pressurization of the fiber composite components to be joined is thus made possible by magnetic attraction.

In a development, magnets of the magnet arrangement can extend in the thickness direction through a bottom part and/or a top part of the cover in the region of the joining zone. In this case, the magnets can additionally be designed and provided as electric contacts for conducting a welding current for welding the fiber composite components. Thus, additional electrically conductive elements are advantageously no longer required for resistance welding.

According to one embodiment, the cover is of at least substantially airtight design. It is thus suitable for a vacuum arrangement.

In another embodiment, the cover is designed to be permeable to air and impermeable to thermoplastic polymer melt. It is thus semi-permeable and is suitable particularly for direct contact with the joining zone when an outer boundary layer of the fiber composite components is also melted during the welding process.

In another embodiment, the cover is constructed from two layers, wherein a first layer is of airtight design and a second layer is designed to be permeable to air and impermeable to thermoplastic polymer melt. In this way, the properties of both layers are advantageously used in a synergistic way since this arrangement additionally enables any gases that are liberated only during the welding process additionally to be extracted. It is thereby additionally possible to avoid porosity in the welding zone and thus further improve the joining quality.

According to one embodiment, the cover can have a flexible mold, e.g. a silicone mold, with integrated conductive elements. As an alternative or in addition, the cover can comprise a metal and/or plastic film. As a further alternative or further addition, the cover can comprise a metal and/or plastic textile. In this way, it is advantageously possible to achieve the cover properties of conduction in the thickness direction and insulation in the main direction of extent.

According to one embodiment, the cover contains a multi-material mix consisting of or comprising conductive and non-conductive materials, wherein the conductive materials connect the two surfaces of the cover electrically to one another and are at least predominantly spaced apart from one another. In particular, they are spaced apart in the directions of extent of the main surface of the cover. In this way, the conducting and insulating properties of the materials can be used to provide direction-dependent conductivity. For example, it can be a plastic film with embedded metal particles, a silicone mold with embedded metal bars and/or a synthetic fiber textile with introduced metal threads.

According to one embodiment of an apparatus for thermally joining thermoplastic fiber composite components, the welding device is designed as a resistance welding device, wherein the pressurization arrangement has a top part and/or a bottom part, which is formed with a cover according to the disclosure herein. In this case, the cover is designed to transmit a welding current of the welding device into the joining zone. Thus, welding is advantageously made possible in a continuous process, independently of the pressurization, and, at the same time, a welding current flow can advantageously be controlled by the positioning of welding electrodes on the cover.

In one embodiment of an apparatus for thermally joining thermoplastic fiber composite components, the welding device is designed as a welding source with movable electrodes, for example. The electrodes can have rollers or brushes designed for moving or sliding contact, for example. In this way, linear welding along the electric contacts of the pressurization arrangement is made possible.

According to one embodiment, the welding device can be designed as a welding source with stationary electrodes. In this case, a welding filler material is preferably introduced into the joining zone and a welding current applied thereto. In this case, a vacuum diaphragm or airtight mold of the pressurization arrangement can be formed without electric conductivity away from the electrodes. In the region of the electrodes, the vacuum diaphragm or airtight mold of the pressurization arrangement can be of electrically conductive design here.

According to one embodiment, the welding device is designed as a movable induction source. This is configured in such a way that the fiber composite components can be welded inductively through the pressurization device. In this case, cooling of the pressurization device, e.g. by compressed air, is preferably provided in addition.

According to one embodiment, the welding device is designed as a movable laser source. In this case, the pressurization device provided is at least substantially transparent for the laser radiation of the laser source and is preferably cooled in addition. The fiber composite components can thus be welded by a laser beam through the pressurization device.

According to one embodiment, the welding device is designed as a movable ultrasound source. This has, in particular, a sonotrode. Here, the sonotrode and the pressurization device are configured in such a way that the fiber composite components can be welded by ultrasound through the pressurization device. For this purpose, cooling of the pressurization device, e.g. by compressed air, is preferably provided.

The above embodiments and developments can be combined in any way, as appropriate. In particular, all the features of the method for thermally joining thermoplastic fiber composite components can be applied to the apparatus for thermally joining thermoplastic fiber composite components, and vice versa. Moreover, all the features of the cover for a pressurization device for thermally joining thermoplastic fiber composite components can be applied both to the method and to the apparatus.

Further possible embodiments, developments and implementations of the disclosure herein also include combinations not explicitly mentioned of features of the disclosure herein that are described above or below in respect of the illustrative embodiments. In particular, a person skilled in the art will also add individual aspects as improvements or additions to the respective basic form of the disclosure herein.

BRIEF DESCRIPTION OF THE DRAWINGS

The disclosure herein is explained in greater detail below by the illustrative, example embodiments indicated in the schematic figures. Here:

FIG. 15 shows a cross-sectional view of an apparatus for thermally joining thermoplastic fiber composite components according to another embodiment;

FIG. 16 shows a segment of a cross-sectional view of a modification of the embodiment shown in FIG. 15;

Figure 1:
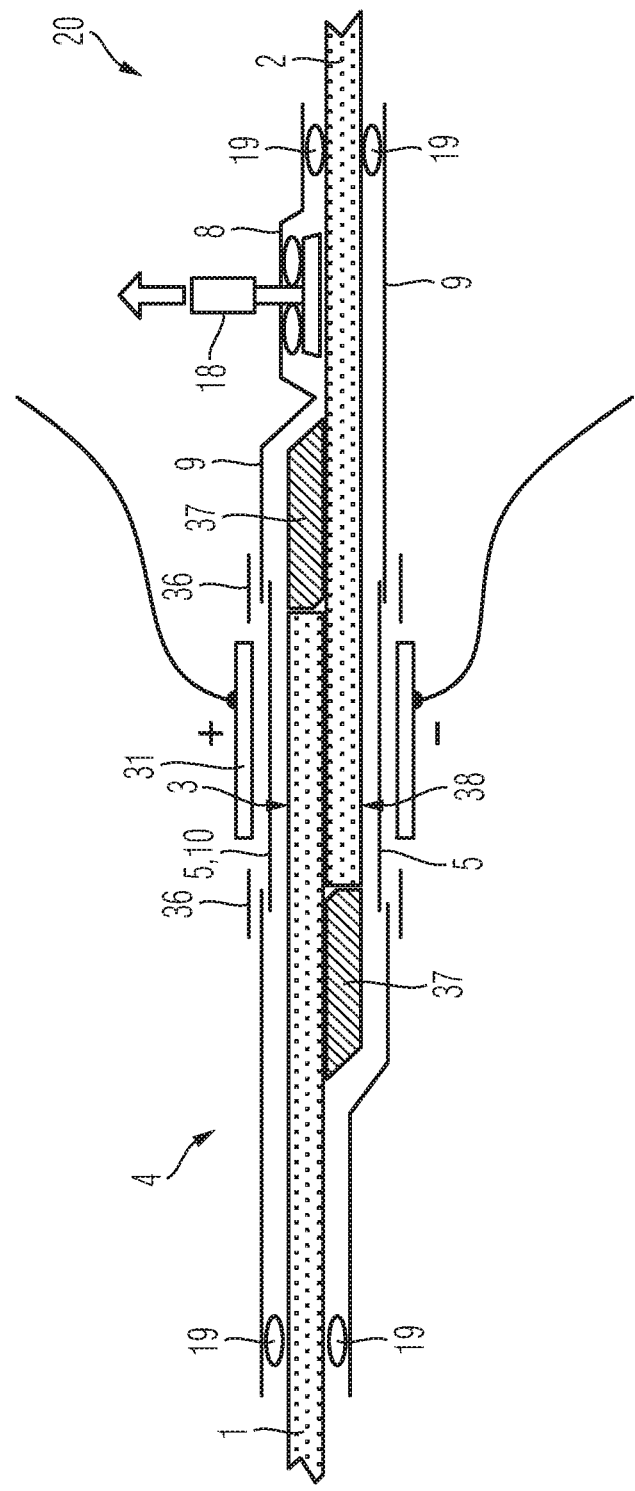
FIG. 1 shows a cross-sectional view of an apparatus for thermally joining thermoplastic fiber composite components according to one embodiment.

The attached figures are intended to impart further understanding of the embodiments of the disclosure herein. They illustrate embodiments and, together with the description, serve to explain principles and concepts of the disclosure herein. Other embodiments and many of the stated advantages will become apparent with reference to the drawings. The elements of the drawings are not necessarily shown to scale relative to one another.

In the figures of the drawing, identical, functionally identical and identically acting elements, features and components are—unless stated otherwise—each provided with the same reference signs.

DETAILED DESCRIPTION

FIG. 1 shows a cross-sectional view of an apparatus 20 for thermally joining thermoplastic fiber composite components 1, 2 according to one embodiment.

The apparatus 20 has a pressurization arrangement 4 and a welding device 31.

Here, the pressurization arrangement 4 is designed as a vacuum arrangement 8. This has a vacuum diaphragm 9, a suction nozzle 18, which is designed for connection to a vacuum source, e.g. a vacuum pump, and sealing elements 19 for sealing the vacuum diaphragm 9 with respect to the environment.

Thermoplastic fiber composite components 1 and 2 to be joined are arranged with an overlapping joint. Furthermore, electric contacts 5, which are connected airtightly to the vacuum diaphragm 9, are provided in the region of a joining zone 3 of the fiber composite components to be welded, the joining zone being arranged in the region of overlap 38.

By way of example, airtight adhesive tapes 36 are provided here for the airtight connection of the elements of the vacuum arrangement 8. For the sake of clarity, these tapes are depicted purely schematically with a certain clearance but, of course, they actually rest directly on the elements to be connected, in this case the contacts 5 and the vacuum diaphragm 9.

In this embodiment, the joint coverage of the fiber composite components 1, 2 to be joined and the vacuum arrangement 8 comprises applying at least one electrically conductive element 10 as an electric contact 5 in the joining zone 3. To obtain a vacuum arrangement 8, the electrically conductive element 10 is connected airtightly to the vacuum diaphragm 9. The vacuum diaphragm furthermore has a suction nozzle 18, coupled thereto, for connection to a vacuum pump. If a vacuum is applied via the suction nozzle 18, as symbolized by the arrow depicted here, atmospheric pressure acts on the joining zone 3 and thus compresses the fiber composite components 1, 2 in the region of overlap 38 in which the joining zone 3 is situated.

Here, the pressurization arrangement 4 is provided on both sides and fully covers the joining zone 3 both on the top side and on the bottom side. It furthermore extends beyond the region of overlap of the fiber composite components 1, 2. In the embodiment illustrated, by way of example, the pressurization arrangement is in two parts. It is thus sealed off with respect to the two fiber composite components 1, 2 on both sides, in each case individually by the sealing elements 19.

In other embodiments, it would also be conceivable to provide an inflexible mold on the bottom side and to provide the vacuum arrangement 8 only on the top side.

Here, the mounting device 31 is designed with two oppositely arranged welding electrodes, which can be coupled to a welding source. These are welding electrodes that can be moved on the contacts 5 along the joining zone 3. The welding electrodes can be moved independently of the vacuum arrangement 8. The pressure applied by the vacuum arrangement therefore remains constant during and after welding. The pressure is thus maintained until thermoplastic matrix of the fiber composite components 1, 2 solidifies. In this way, welding defects due to air or gas inclusions, which can lead to the formation of pores, are counteracted.

Adjoining the overlap, electrically non-conductive auxiliary inserts 37 are applied on both sides of the joint. These are used to avoid creases in the vacuum diaphragm and thus facilitate airtight connection. The auxiliary inserts 37 can be formed from a material with a sufficiently high melting temperature which is non-conductive and preferably does not stick to thermoplastic matrix, ensuring that they do not melt too during the welding process. The same also applies to the materials of the pressurization arrangement 4 or of the vacuum arrangement 8. As an alternative or in addition, the auxiliary inserts 37 can also be wrapped in non-conductive or insulating film or provided with an insulating coating.

An apparatus 20 of this kind is suitable for a method according to the disclosure herein for thermally joining thermoplastic fiber composite components 1, 2. For this purpose, thermoplastic fiber composite components 1, 2 to be joined are jointly covered with the pressurization arrangement 4 at least in the region of the joining zone 3 in a first step. A further step comprises the extensive pressurization of thermoplastic fiber composite components 1, 2 to be joined by the pressurization arrangement 4, with the result that the fiber composite components 1, 2 are pressed against one another, at least in the joining zone 3. The welding of the fiber composite components 1, 2 in the joining zone 3 during pressurization follows in a further step. The pressurization is then maintained at least until the joining zone 3 solidifies.

To improve the contact between the electric contacts 5 and the fiber composite components 1, 2, the covering of thermoplastic fiber composite components 1, 2 to be joined can comprise the application of a contact paste between the contacts 5 and the fiber composite components 1, 2.

If the pressurization arrangement 4 is provided as a vacuum arrangement 8, as here, the pressurization comprises the application of a vacuum.

Figure 2:
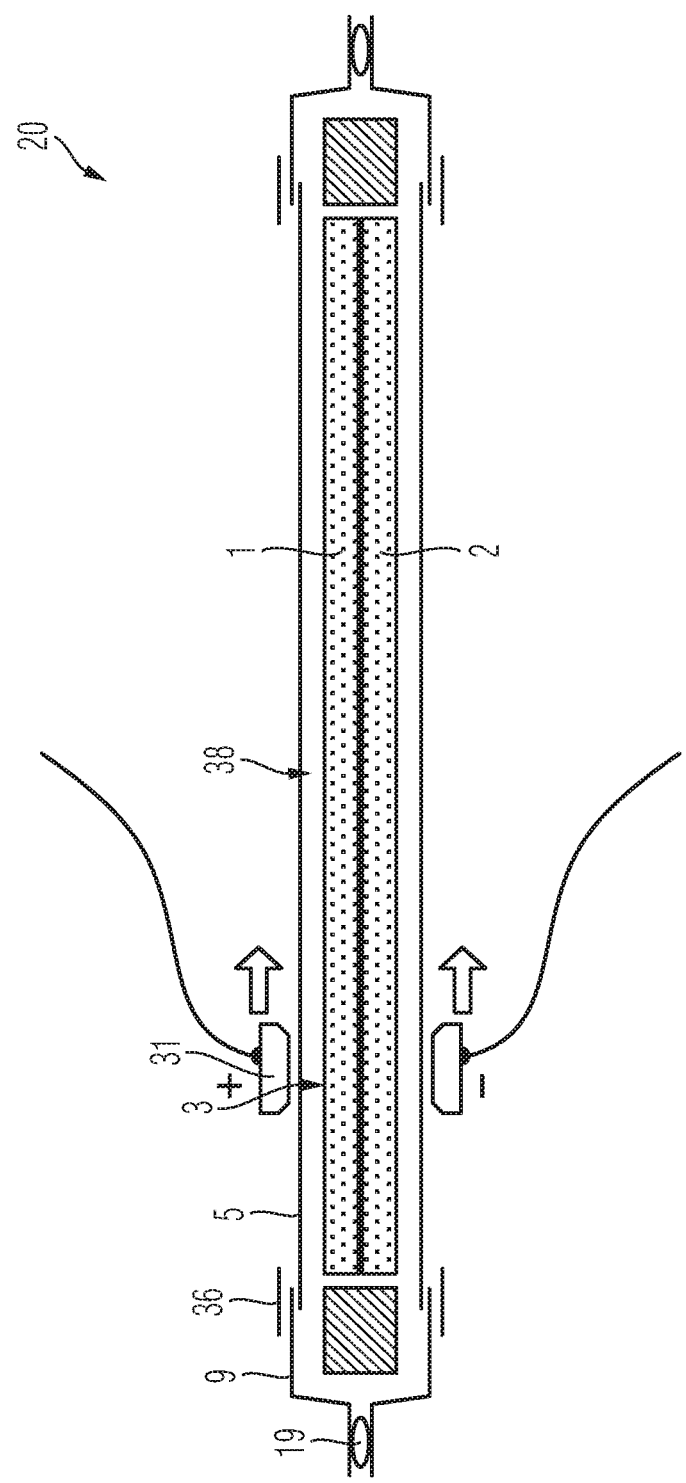
FIG. 2 shows a longitudinal section through the apparatus shown in FIG. 1.

FIG. 2 shows a longitudinal section through the apparatus 20 shown in FIG. 1.

Here, the fiber composite components 1, 2 are accordingly shown as continuous in the region of overlap 38, which defines the length to be connected in the joining zone 3 and over which the contacts 5 also extend in a continuous manner. The welding electrodes of the welding device 31 are designed to be longitudinally movable along the contacts 5, as symbolized by the arrows depicted. In this way, the welding along the joining zone 3 is performed continuously by local application of a welding current to the contacts 5, wherein the welding electrodes are moved forwards in parallel along the joining zone 3.

The electrodes are accordingly formed with a surface which slides well on the contacts. In further embodiments, the electrodes can also alternatively or additionally have rollers or brushes designed for moving or sliding contact, for example.

Since the contacts 5 are connected in an airtight manner to the vacuum diaphragm 9, the vacuum remains constant during the welding operation. The vacuum continues to be applied even after the welding process, until the joining zone 3 has solidified at least predominantly. This can be the case, for example, as soon as the joining zone has cooled to below the glass transition temperature of thermoplastic matrix material.

Figure 3:
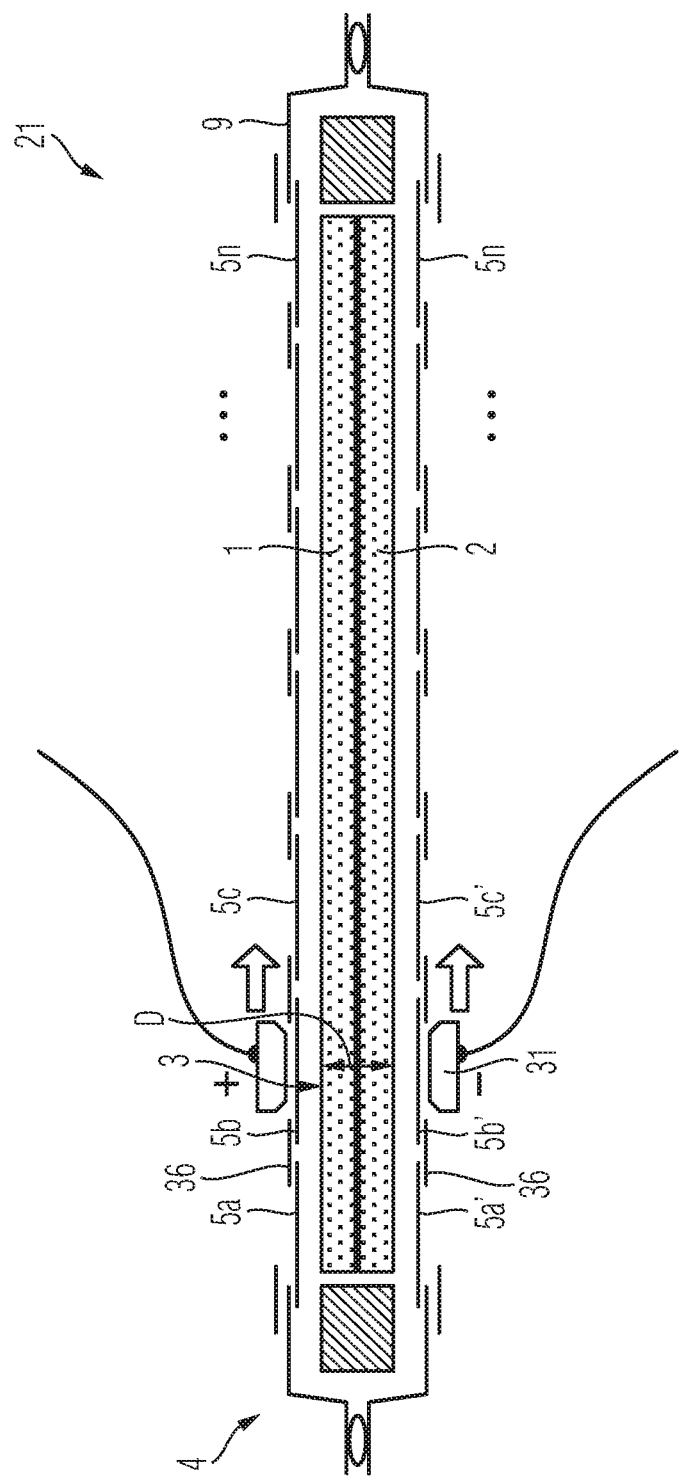
FIG. 3 shows a longitudinal section through an apparatus for thermally joining thermoplastic fiber composite components according to another embodiment.

FIG. 3 shows a longitudinal section through an apparatus 21 for thermally joining thermoplastic fiber composite components according to another embodiment.

This embodiment is distinguished by division of the electric contacts 5 into a multiplicity of mutually isolated contact sections 5a, 5b, 5c, . . . , 5n on the top side and 5a', 5b', 5c', . . . , 5n' on the bottom side. The actual number of mutually isolated contact sections is not limited here, as is indicated by the three dots between 5c and 5n and between 5c' and 5n'. In this regard, the illustration should be taken as purely illustrative. In the embodiment illustrated, the airtight electrically insulated connection of the contact sections is implemented by airtight adhesive tapes 36, by way of example.

To weld the fiber composite components 1, 2, an apparatus 21 of this type is used to apply a welding current simultaneously to two respectively opposite contact sections 5a, 5a', 5b, 5b', 5c, 5c' or 5n, 5n' on both sides of the joining zone 3. The welding electrodes of the welding device 31 move forwards substantially in the same way in parallel along the joining zone 3 as described with reference to FIG. 2, and therefore the contact sections are traversed in succession. Here, the current flow of the welding current is always provided in the thickness direction of the fiber composite components and, by virtue of the insulated connection of the contact sections, also cannot be distributed laterally or via other sections of the contacts. This ensures that the welding of the fiber composite components 1, 2 is controlled by a current flow in the thickness direction D of the fiber composite components 1, 2.

Figure 4:
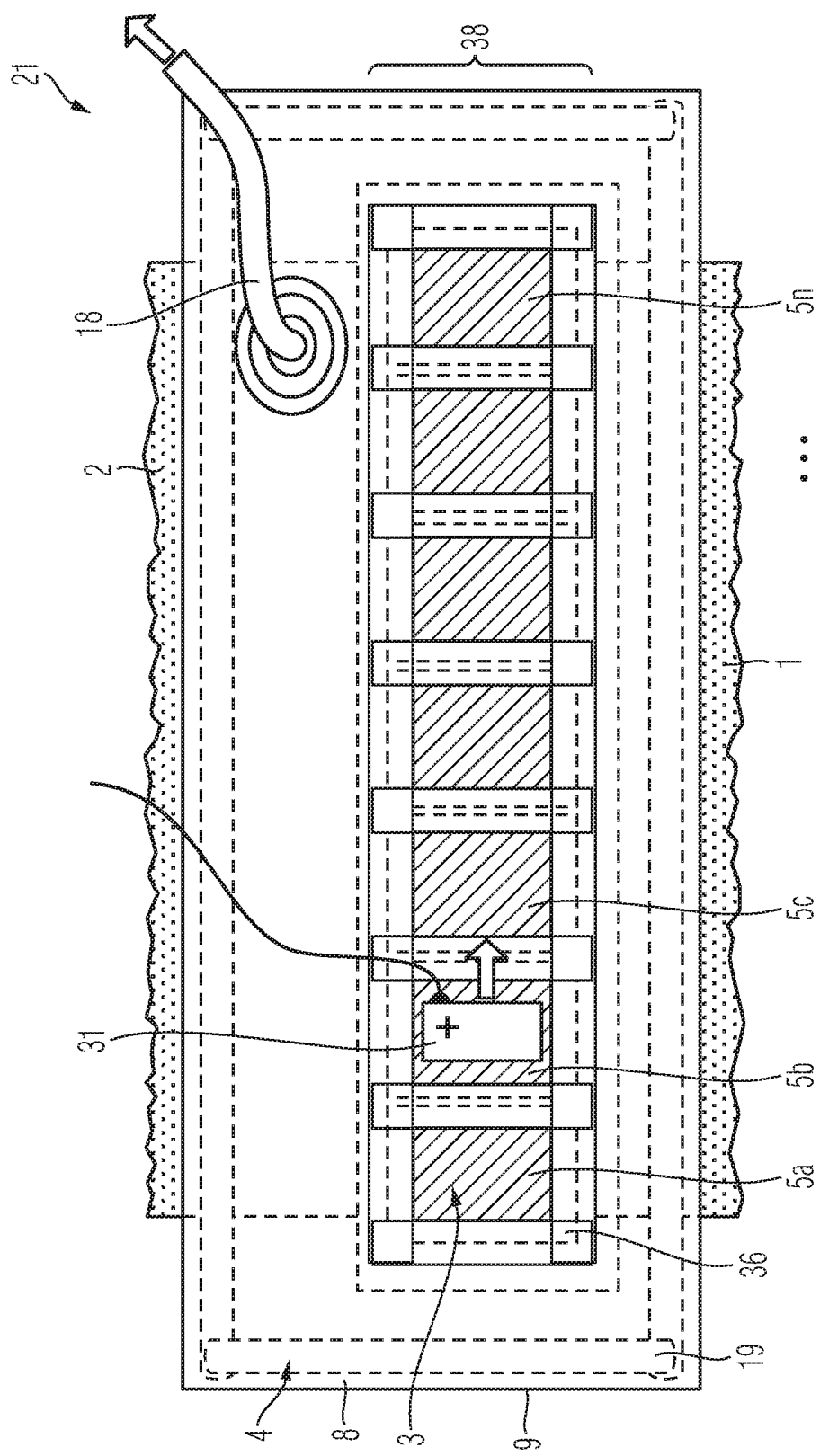
FIG. 4 shows a plan view of the apparatus shown in FIG. 3.

FIG. 4 shows a plan view of the apparatus shown in FIG. 3.

In this figure, it can be seen that the fiber composite components 1, 2 are fully covered by the pressurization arrangement 4 in the region of overlap 38. The vacuum arrangement 8 thus produces the vacuum uniformly in the entire region of overlap 38, in particular over the entire joining zone 3.

As can likewise be seen, the contact sections 5a, 5b, 5c, . . . , 5n, which are connected to one another in an airtight and electrically insulated manner, are distributed over the entire width of the joining zone, ensuring that the fiber composite components 1, 2 are welded over their entire width by the depicted longitudinal movement of the welding electrodes. Here, the welding electrodes of the welding device 31 contact the individual contact sections in succession, and therefore the welding of the joining zone is performed in segments.

The seal comprising the sealing elements 19 is provided in such a way as to extend around the joining zone. The pressurization applied by the vacuum arrangement 8 is thus the same in all segments of the joining zone.

Figure 5:
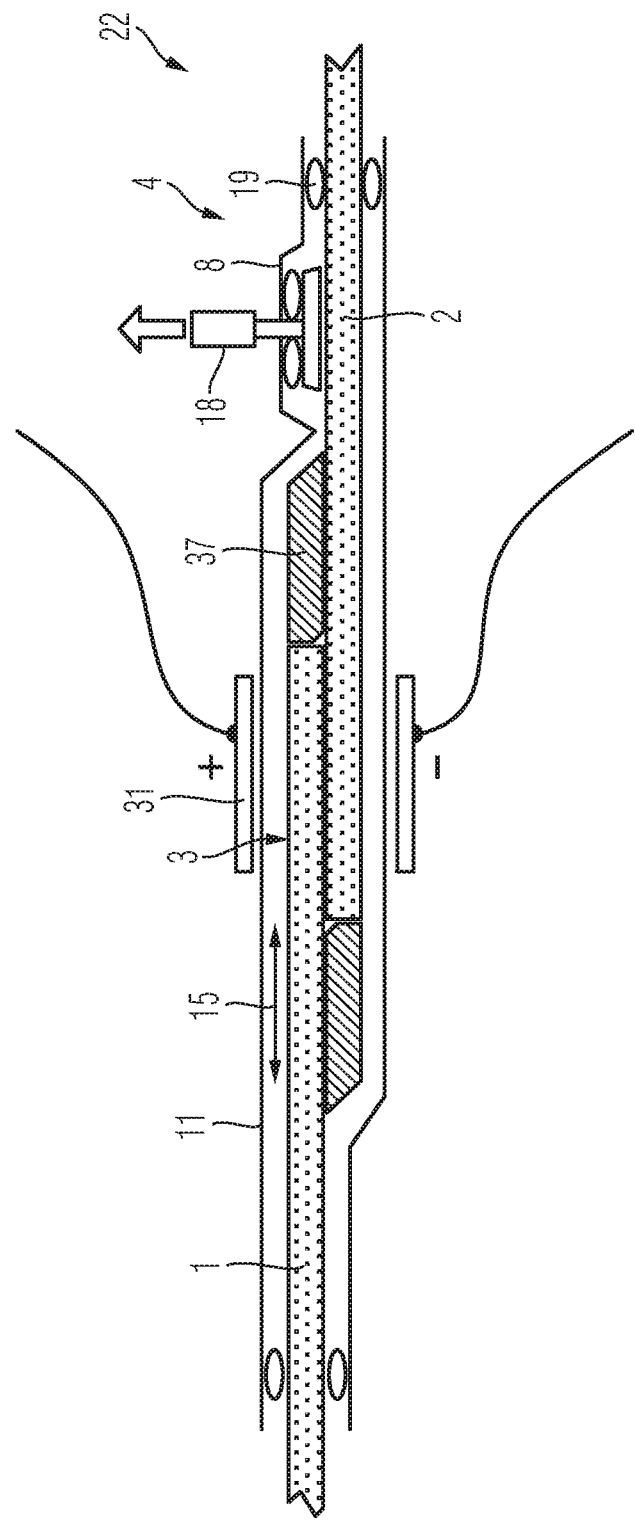
FIG. 5 shows a cross-sectional view of an apparatus for thermally joining thermoplastic fiber composite components according to another embodiment.

FIG. 5 shows a cross-sectional view of an apparatus 22 for thermally joining thermoplastic fiber composite components 1, 2 according to another embodiment.

In this embodiment, a cover in the form of a directionally conductive diaphragm 11 is provided instead of a conventional vacuum diaphragm 9 of the pressurization device. The diaphragm 11 is of substantially flexible and airtight design and differs significantly in its direction-dependent electric conductivity normal to the extent of the main surface thereof. In the directions 15 of extent of the main surface thereof, in contrast, the diaphragm 11 is of electrically insulating design. The diaphragm 11 can therefore be constructed in a substantially simpler way than the vacuum diaphragm 9 since there is no need for interruptions or additional electrically conductive elements.

In this way, it is possible to carry out welding here without additional insulating measures in the joining zone 3.

Figure 6:
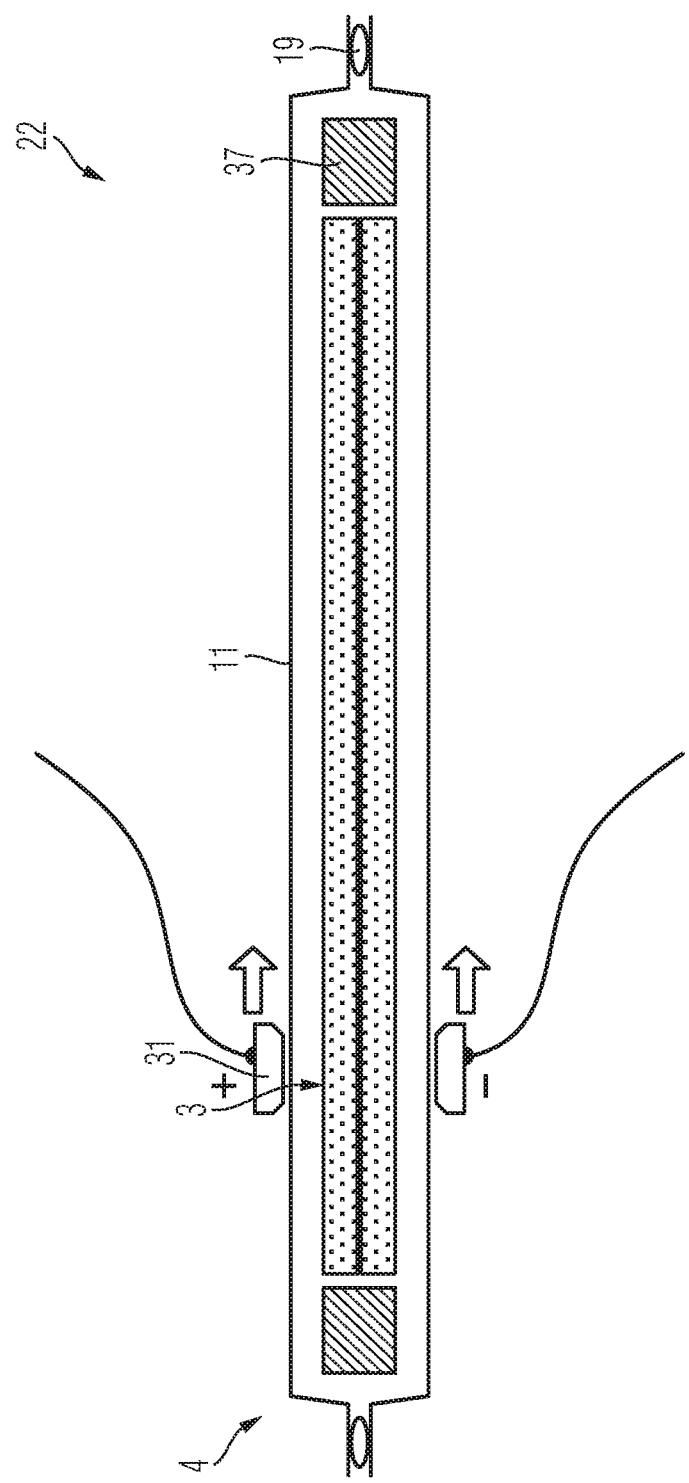
FIG. 6 shows a longitudinal section through the apparatus shown in FIG. 5.

FIG. 6 shows a longitudinal section through the apparatus 22 shown in FIG. 5.

Here too, welding is performed by a longitudinal movement (symbolized by the arrows) of the welding electrodes of the welding device 31 along the joining zone 3. As a particular advantage, continuous welding is thus made possible by the movement.

By virtue of the direction-dependent electric conductivity of the cover, there is no longer any division into segments in which the fiber composite components 1, 2 can be welded in succession by an apparatus 21 shown in FIGS. 3 and 4. On the contrary, it is always possible, with the apparatus 22 illustrated here, to perform local welding precisely at the location of the joining zone 3 at which a welding electrode of the welding device 31 is situated at a particular time.

Thus, a weld pool of the welding process moves continuously forwards with the welding electrodes along the joining zone. As a result, welding takes place very uniformly and therefore a homogeneous weld seam is achieved.

Figure 7:
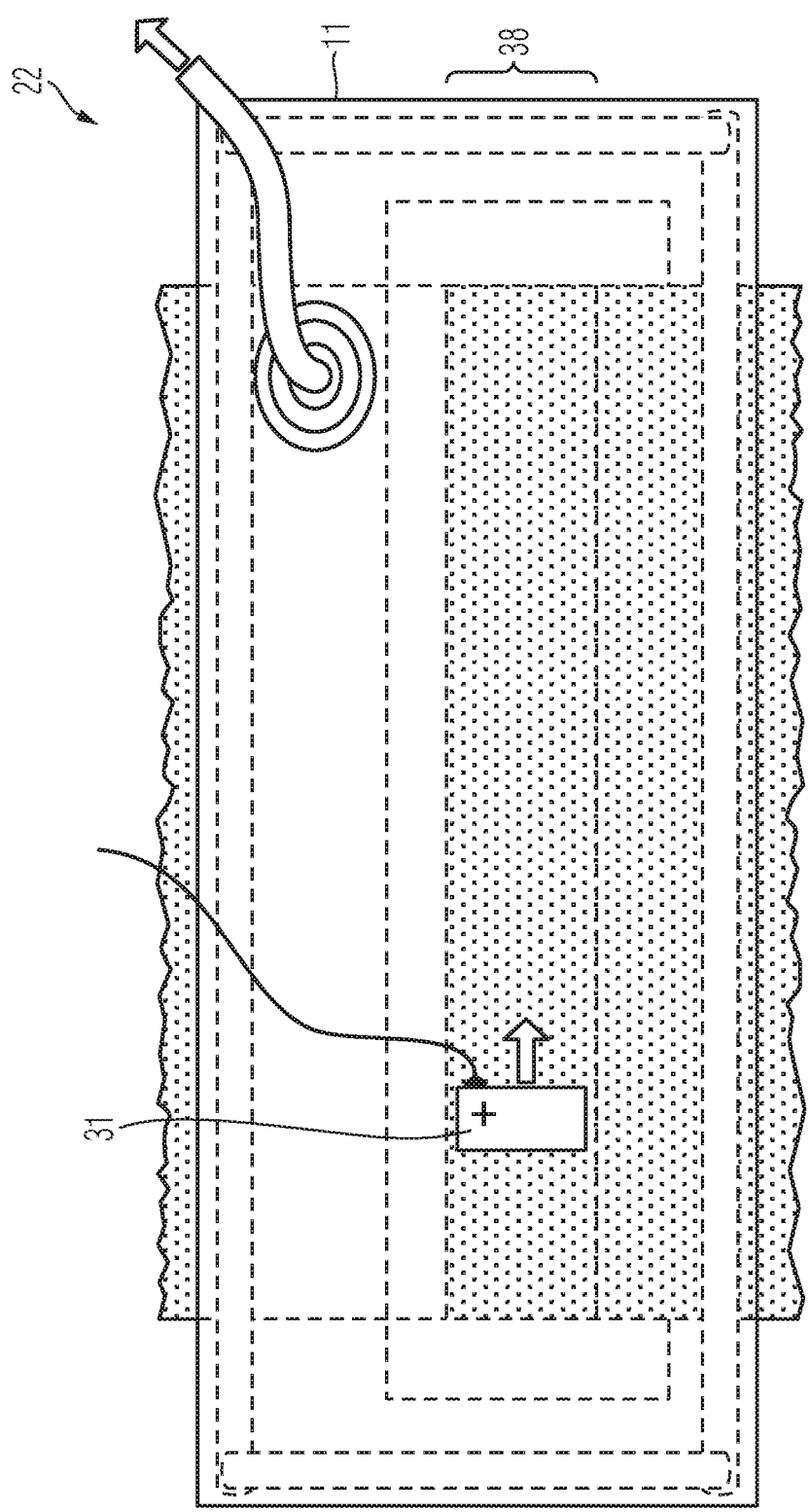
FIG. 7 shows a plan view of the apparatus shown in FIGS. 5 and 6.

FIG. 7 shows a plan view of the apparatus shown in FIGS. 5 and 6.

As can be seen, the diaphragm 11 of the cover covers the entire region of overlap 38 here. In particular, there is no need for an interruption in the diaphragm 11.

To provide the airtight and flexible design which is electrically conductive only normally to the main direction of extent, the diaphragm 11 can be a multi-material mix consisting of or comprising conductive and non-conductive materials, wherein the conductive materials connect the two surfaces of the diaphragm 11 electrically to one another and are at least predominantly spaced apart from one another. For example, the diaphragm 11 contains a plastic film with embedded metal particles that span the thickness of the film or an airtight synthetic fiber textile with metal threads introduced therein and passing through the thickness of the textile.

Figure 8:
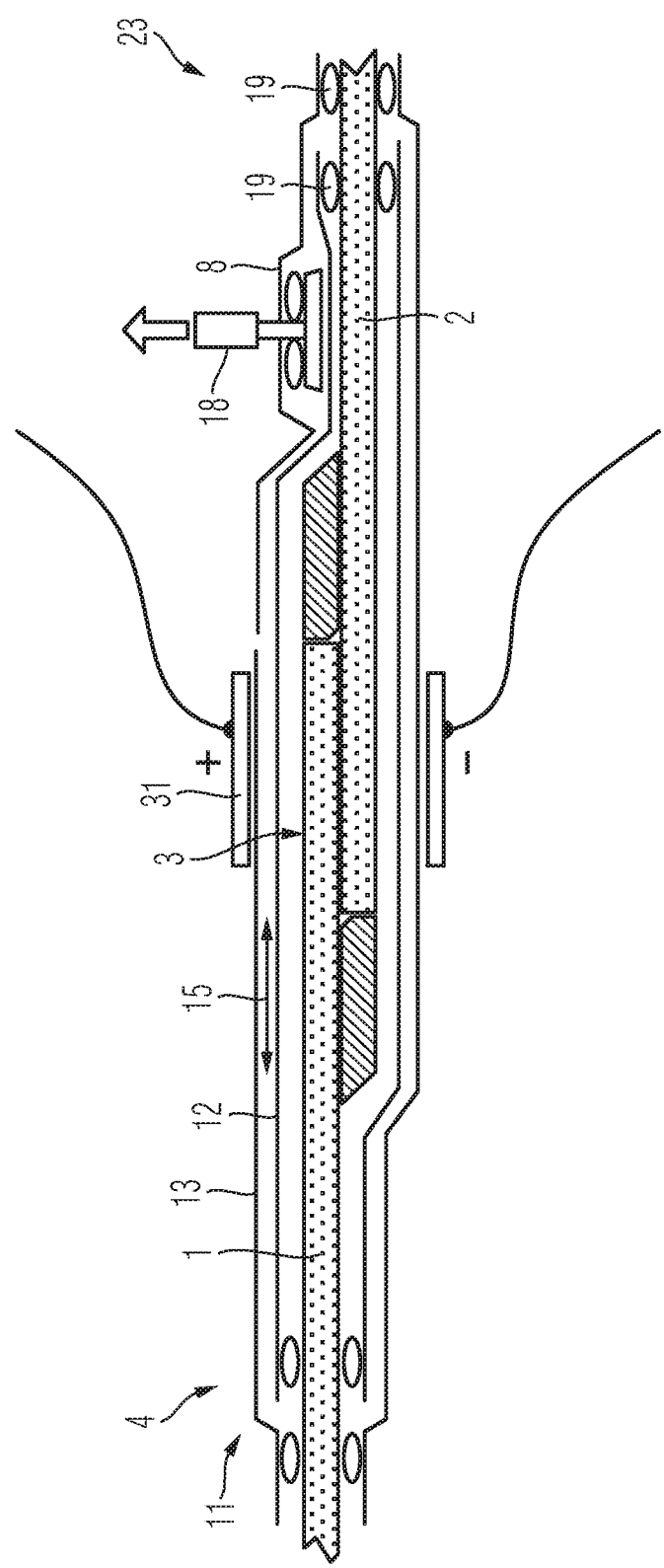
FIG. 8 shows a cross-sectional view of an apparatus for thermally joining thermoplastic fiber composite components according to another embodiment.

FIG. 8 shows a cross-sectional view of an apparatus 23 for thermally joining thermoplastic fiber composite components according to another embodiment.

In this embodiment, although a diaphragm 11 is provided as a cover, the diaphragm 11 is constructed from two layers 12, 13, in contrast to FIGS. 5 through 7. A first, outer layer 13 is of airtight and flexible design and is designed to be electrically conductive only normally to the main direction of extent. It is, in particular, an airtight or approximately airtight medium, e.g. a film or a textile. The cover has a significant electric conductivity only in the thickness direction. In directions parallel to its surface, however, it does not have any significant electric conductivity.

A second layer 12 is designed to be permeable to air and impermeable to thermoplastic polymer melt. This is, in particular, a semi-permeable medium which is permeable to air but at least virtually impermeable to the melted or liquefied matrix material in a weld pool of the mating parts. Furthermore, the second layer 12, like the first layer 13, has a significant electric conductivity only in the thickness direction. In directions parallel to the surface, however, it does not have any significant electric conductivity.

In the embodiment illustrated, the first layer 13 and the second layer 12 are each sealed off separately with respect to the fiber composite components 1, 2 by sealing elements 19. Here too, the cover is designed as a vacuum arrangement 8. In the event of pressurization by the application of a vacuum to the suction nozzle 18, air that is present between the second layer and the fiber composite components is sucked out through the second layer 12, thus ensuring that a uniform pressure is applied to a joining zone 3 in the same way as with just one layer. With this arrangement, however, it is advantageously possible even for gases liberated in the welding process to be sucked off easily through the second diaphragm during the welding process. In this way, it is additionally possible to avoid or reduce porosity in the welding zone.

Figure 9:
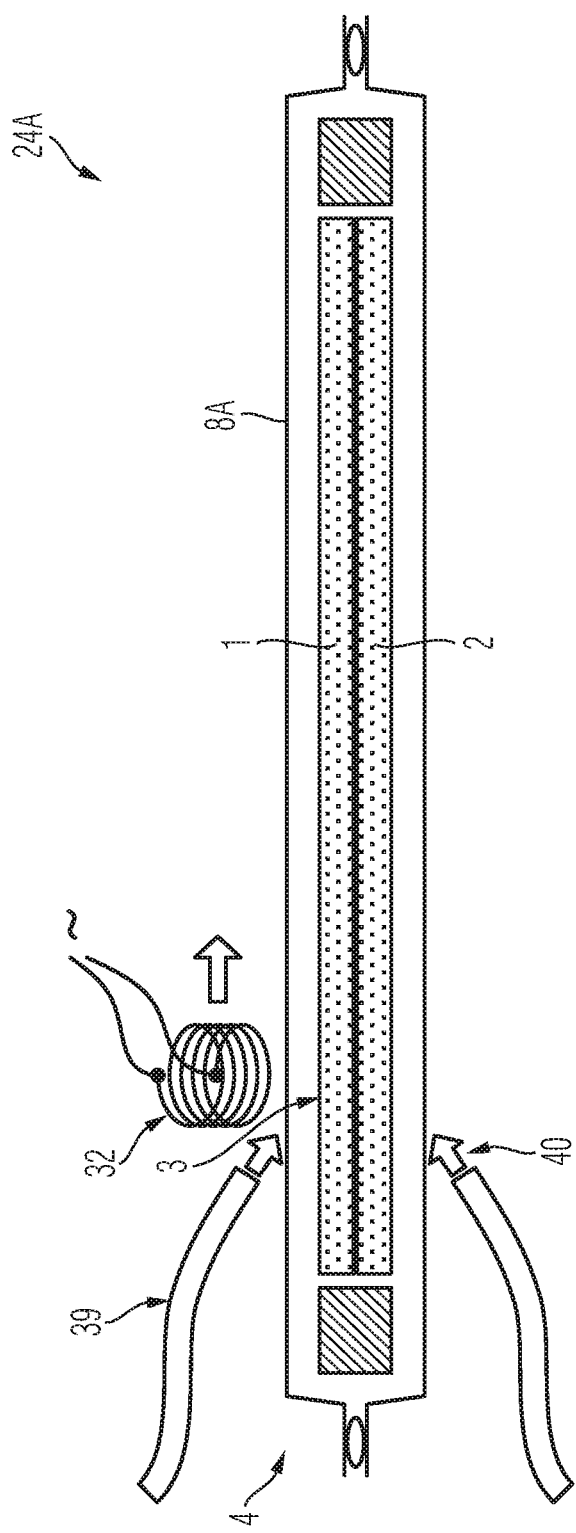
FIG. 9 shows a longitudinal section through an apparatus for thermally joining thermoplastic fiber composite components according to another embodiment.

FIG. 9 shows a longitudinal section through an apparatus 24A for thermally joining thermoplastic fiber composite components according to another embodiment.

In this embodiment of the apparatus 24A, in contrast to the previous embodiments, welding energy is input by induction into the fiber composite components 1, 2 to be joined. The vacuum arrangement 8A is designed to be permeable to magnetic fields. The fiber composite components 1, 2 are thus welded by alternating magnetic fields which are applied from outside the vacuum arrangement 8A and which induce eddy currents associated with resistance within the fiber composite components. For this purpose, an inductive welding device 32, e.g. in the form of an induction coil, is passed over the joining zone 3 from outside the vacuum arrangement 8A. To achieve this, the mounting device 32 can, for example, move continuously over the joining zone 3, as symbolized by the movement arrow depicted.

In this embodiment, active cooling of the vacuum arrangement 8 is provided. For this purpose, a cooling fluid source 39, in this case, by way of example, in the form of a compressed air supply, is provided, which supplies a continuous flow of cooling fluid 40, in this case, by way of example, compressed air, over the vacuum arrangement 8. This ensures that an energy input in the centre of the joining zone 3, at the interface between the fiber composite components 1, 2, is significantly higher than in the outer region close to the surface.

In other embodiments, other cooling methods or means of conveying cooling fluid, such as cooling ducts or the like, can of course be employed.

Figure 10:
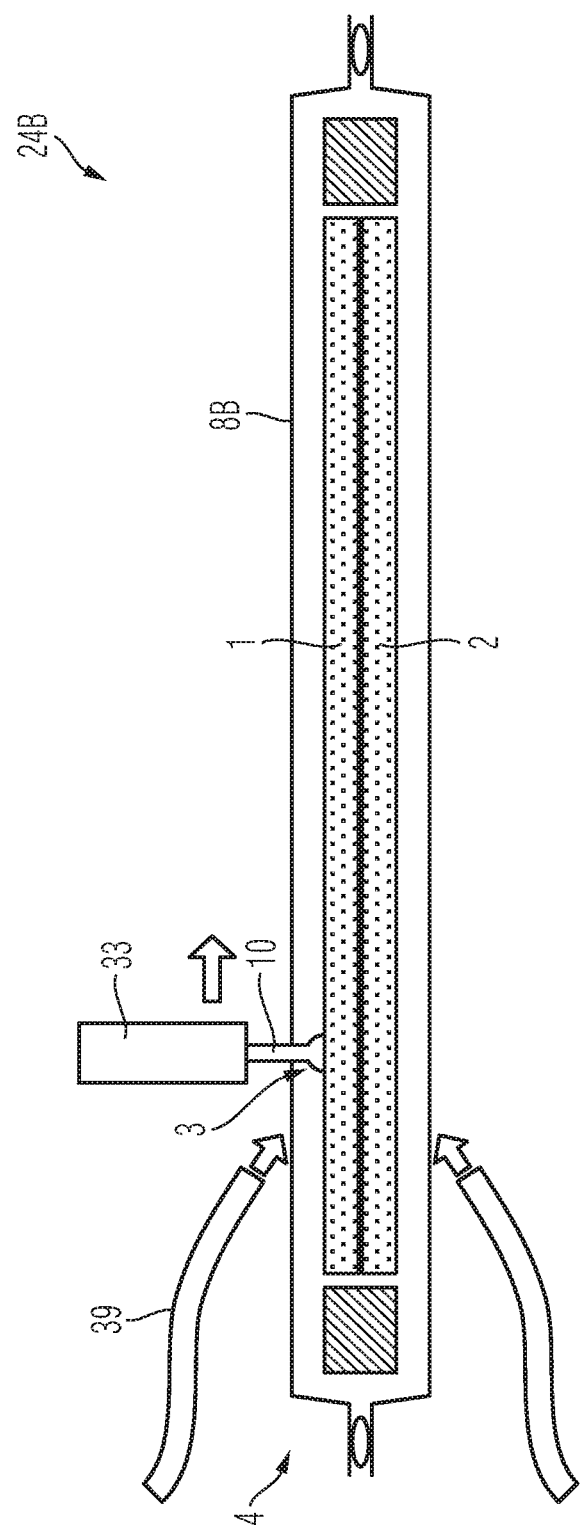
FIG. 10 shows a longitudinal section through a modified apparatus for thermally joining thermoplastic fiber composite components.

FIG. 10 shows a longitudinal section through a modified apparatus 24B for thermally joining thermoplastic fiber composite components 1, 2.

In this embodiment 25, in contrast to the previous embodiments, welding energy is input by a laser beam 10 into the fiber composite components 1, 2 to be joined.

Here, the vacuum arrangement 8B provided is transparent for a predetermined laser radiation of a laser source 33, ensuring that the laser beam passes through. The fiber composite components 1, 2 are thus welded by the laser beam 10, which is introduced from outside the vacuum arrangement 8 and which moves along the joining zone. Since laser weld seams are relatively narrow, multiple parallel welding in the region of overlap 38 is also conceivable in this case.

In this embodiment too, active cooling of the vacuum arrangement 8B is preferably provided, this being designed, by way of example, with a cooling fluid source 39 in the same way as explained with reference to FIG. 9.

Figure 11:
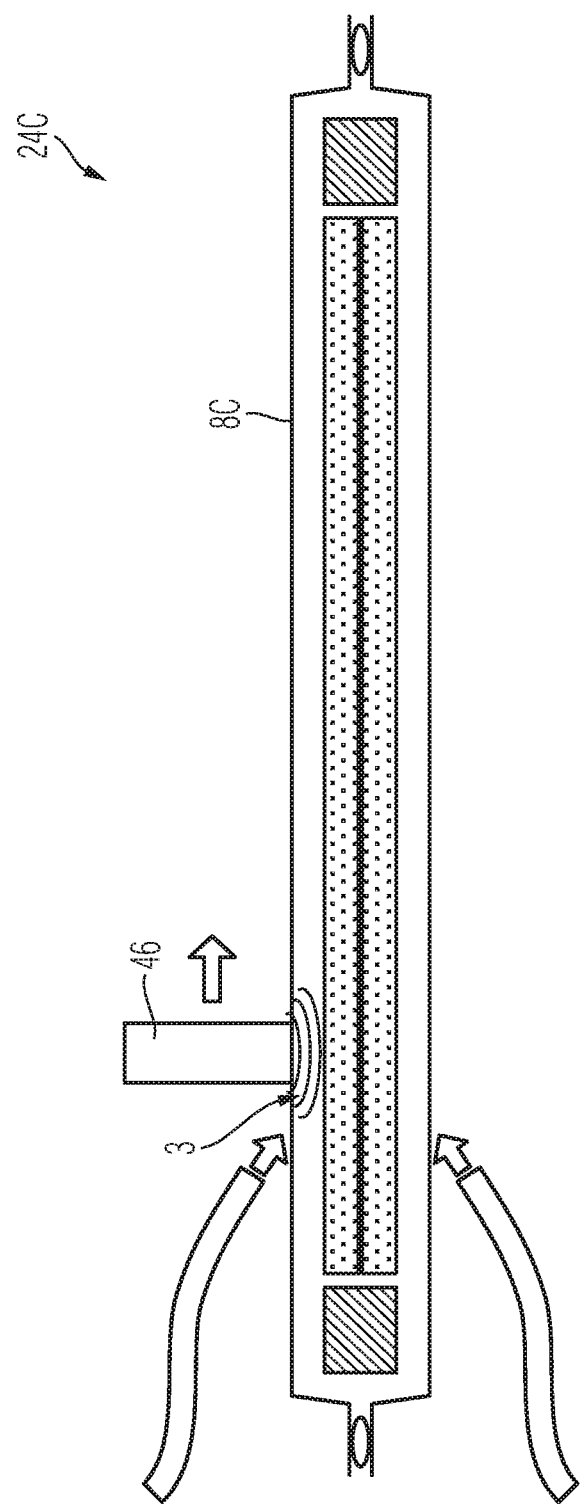
FIG. 11 shows a longitudinal section through another modified apparatus for thermally joining thermoplastic fiber composite components.

FIG. 11 shows a longitudinal section through another modified apparatus 24C for thermally joining thermoplastic fiber composite components.

In this apparatus 24C, in contrast to the previous embodiments, welding energy is input by ultrasound into the fiber composite components 1, 2 to be joined. For this purpose, a welding device 46 in the form of an ultrasonic sonotrode is provided. The vacuum arrangement 8C is designed in such a way that it transmits the ultrasound from the outside into the joining zone. The fiber composite components 1, 2 are thus welded by ultrasound excited from outside the vacuum arrangement 8C by the sonotrode and transmitted via the vacuum arrangement 8C.

In this embodiment too, active cooling of the vacuum arrangement 8 is preferably provided, this being designed, by way of example, with a cooling fluid source 39 in the same way as explained with reference to FIG. 9. Particularly in the case of a vacuum bag or a vacuum diaphragm as a vacuum arrangement 8C, it is possible in this way to avoid sticking.

The vacuum diaphragm and the sonotrode are designed in such a way here that the vacuum diaphragm transmits or conducts the ultrasound into the joining zone.

Figure 12:
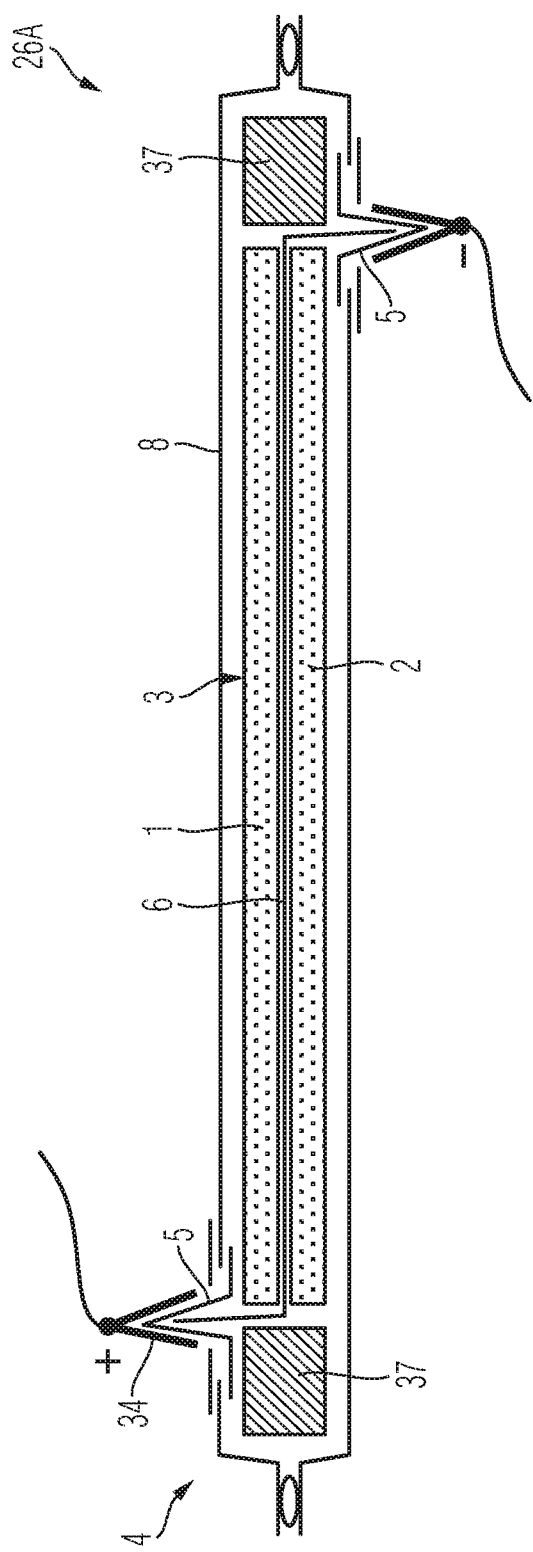
FIG. 12 shows a longitudinal section through an apparatus for thermally joining thermoplastic fiber composite components according to another embodiment.

FIG. 12 shows a longitudinal section through an apparatus 26A for thermally joining thermoplastic fiber composite components 1, 2 according to another embodiment.

This embodiment is once again an apparatus 26A for resistance welding. In this embodiment, however, a welding current is not introduced into the joining zone 3 via the fiber composite components 1, 2 to be joined themselves but via a welding filler material 6. This is a conductive welding filler material 6 of appropriate design which is introduced in the joining zone 3 between thermoplastic fiber composite components 1, 2 to be joined. For example, it can be a conductive thermoplastic prepreg layer.

The pressurization arrangement 4 has electric contacts 5 which are arranged laterally on the joining zone 3 and to which the welding filler material 6 is connected. For this purpose, the welding filler material is guided at the longitudinal end of the joining zone 3 directly to the electric contact 5 connected in an airtight manner to the vacuum arrangement 8. Welding aids in the form of auxiliary inserts 37 for the delimitation of the joining zone 3 are provided laterally with respect thereto.

In the embodiment illustrated, a vacuum arrangement 8 is likewise provided for pressurization. Here too, the pressure is applied before welding.

Welding is performed by applying a welding current to the welding filler material 6, which is heated by the welding current, and the overlapping surfaces of the fiber composite components 1, 2 melts. Owing to the externally acting pressure, the melted surfaces are joined to the welding filler material 6 and are thus welded to one another.

In other embodiments, the welding filler material 6 can be surrounded by an electrically non-conductive layer. Of course, the contact points are excepted from such a layer. An unwanted outflow of current into the fiber composite components is thus avoided. Instead, a current flow exclusively through the welding filler material is ensured, guaranteeing the desired uniform heat distribution across the entire welding filler material 6 and the corresponding melting of the fiber composite components 1, 2. The non-conductive layer is welded along with the remainder of the welding filler material in the joining zone 3. It is formed by glass fiber/thermoplastic prepreg layers, for example, and therefore it does not become conductive even when the matrix of the fiber composite components 1, 2 to be joined melts.

Figure 13:
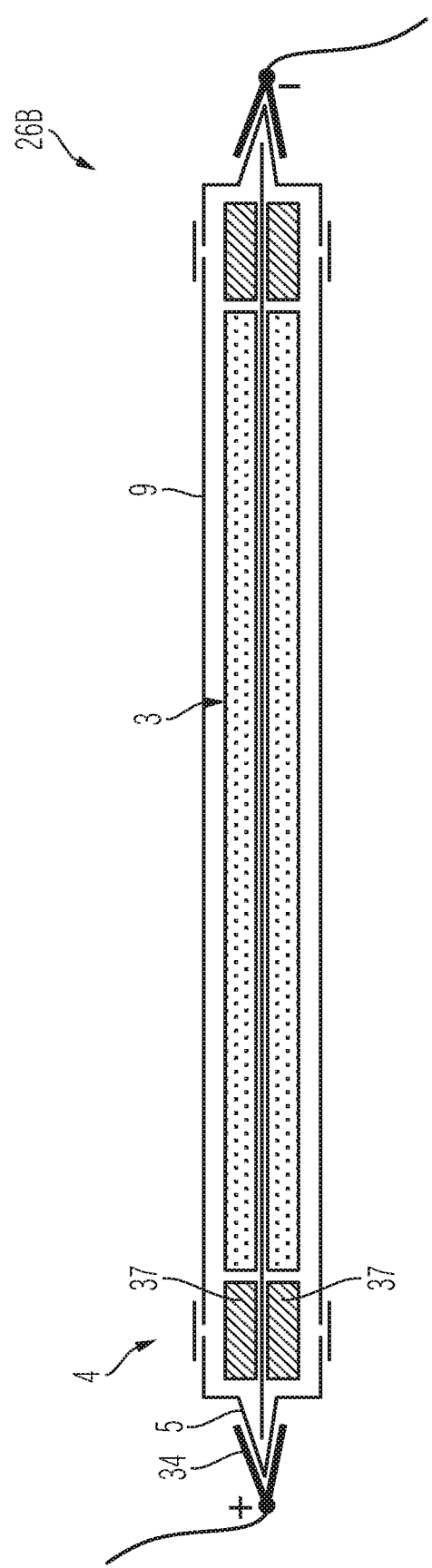
FIG. 13 shows a longitudinal section through a modified apparatus for thermally joining thermoplastic fiber composite components.

FIG. 13 shows a longitudinal section through a modified apparatus 26B for thermally joining thermoplastic fiber composite components 1, 2 according to another embodiment.

Apparatus 26B differs from the apparatus 26A shown in FIG. 12 in the guidance of the welding filler material 6 by the auxiliary inserts 37. The welding filler material 6 is thereby positioned reliably in the joining zone. Melting of the fiber composite components at the edges is furthermore avoided.

With the modified guidance of the welding filler material 6, there is a change in the position of the electric contacts 5, which in this case are arranged at a lateral edge, next to the auxiliary inserts 37.

In other embodiments, it is also possible for welding to be carried out without the auxiliary inserts 37.

Figure 14:
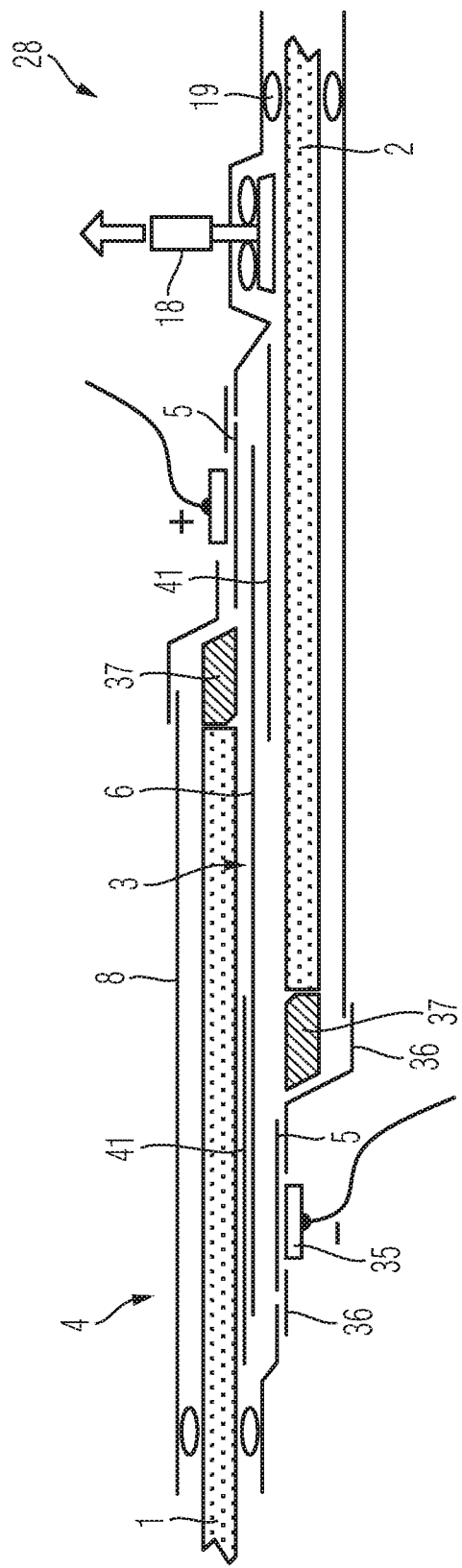
FIG. 14 shows a cross-sectional view of an apparatus for thermally joining thermoplastic fiber composite components according to another embodiment.

FIG. 14 shows a cross-sectional view of an apparatus 28 for thermally joining thermoplastic fiber composite components 1, 2 according to another embodiment.

In this apparatus 28, there is a further variation of the guidance and contacting of the welding filler material 6. Here, the filler material extends across the joining zone 3 along the fiber composite components 1, 2. Auxiliary inserts 37 are provided at the longitudinal ends of the joining zone 3 in order to delimit the joining zone. The contacts 5 of the pressurization arrangement 4 are then provided in the regions adjoining the joining zone 3. The welding filler material 6 extends from both sides under the auxiliary inserts 37, in each case as far as a contact 5, which is arranged next to the joining zone 3 and by which a welding current is passed into the welding filler material 6.

In the regions of the fiber composite components 1, 2 which adjoin the joining zone and along which the welding filler material 6 is guided beyond the joining zone 3, an insulating element 41 is provided for protection between the surface of the fiber composite components 1, 2 and the welding filler material 6. The insulating element 41 can be applied in the form of an insulating parting film between the welding filler material and the respective fiber composite component, for example, in order to avoid melting outside the joining zone 3.

Here too, by way of example, the pressurization arrangement 4 is a vacuum arrangement 8.

FIG. 15 shows a cross-sectional view of an apparatus 29 for thermally joining thermoplastic fiber composite components 1, 2 according to another embodiment.

In this embodiment, the pressurization arrangement 4 is of fundamentally different construction. Although this is likewise a vacuum arrangement 8 having a suction nozzle 18, a flexible airtight mold 14 is provided here as a cover instead of a vacuum diaphragm, in contrast to the embodiments described above.

In particular, the flexible mold 14 comprises a slightly elastically deformable silicone material, with the result that, when a vacuum is applied to the suction nozzle 18, a uniform surface pressure can be exerted on the joining zone 3, as with a vacuum film.

In the region of the joining zone 3, the mold 14 is provided with conductive elements 42 as electric contacts 5, which extend in the thickness direction from an outer to an inner surface of the mold 14. In particular, these are metal bars, which are molded into the mold 14. These are designed and provided to introduce into the joining zone 3 a welding current applied from the outside by a welding electrode of a welding apparatus 31.

The mold 14 is formed by a top part 16 and a bottom part 17, which are each flexible. In other embodiments, it would also be conceivable to provide an inflexible mold instead of the bottom part 17 and to form only the top part as a flexible mold 14.

Here, the terms top and bottom part are in each case relative to the joining zone 3 and should not be taken as restrictive in respect of an absolute alignment of the mold 14.

In respect of their shape, the top part 16 and the bottom part 17 are each matched to the component contour of the fiber composite components 1, 2, and therefore no welding aid inserts are required. By way of example, the suction nozzle 18 is provided only on the top part 16, although mounting on the bottom part is of course likewise conceivable. Furthermore, the conductive elements 42 in the region of the joining zone 3 are provided equally on the bottom part and on the top part.

The mold 14 furthermore has circumferentially arranged integrated sealing lips 43, and therefore no additional sealing elements or adhesive joints are required here either.

On its inner surface, the mold 14 furthermore has integrated channels for uniform pressure distribution over the covered area. In particular, the channels can be distributed in a net-like manner over the inner surface of the mold 14. In the embodiment illustrated, channels 44 of this kind are also provided in the region of the joining zone 3, by way of example, but this is envisaged only in the case of non-melting outer covering layers of the fiber composite components. If the covering layers of the fiber composite components 1, 2 also melt during welding, no channels are provided in the region of the joining zone.

Overall, the flexible mold 14 is in this way configured to join fiber composite components 1, 2 in succession in a series production process with a comparatively high cycle rate, especially in comparison with a vacuum diaphragm, since no manual sealing or contacting measures are required. Instead, the mold 14 is simply closed after the insertion of the fiber composite component 1, 2 and the vacuum is applied, thus enabling the welding process to be started immediately.

In another embodiment, the metal bars can furthermore be of magnetic design. For this purpose, they can be designed as a permanent magnet or as the core of an electromagnet with a coil wound round the outside.

FIG. 16 shows a segment of a cross-sectional view of a modification of the apparatus 29 of the embodiment shown in FIG. 15.

In this modification, the individual conductive elements 42 are each provided with a single welding electrode or a single controllable section of a welding electrode of a welding device 31'. In this way, differential control of the electrode and hence also of the current transfer into the joining zone 3 via the conductive elements 42 are made possible, contributing to better control of the current flow distribution.

Figure 17:
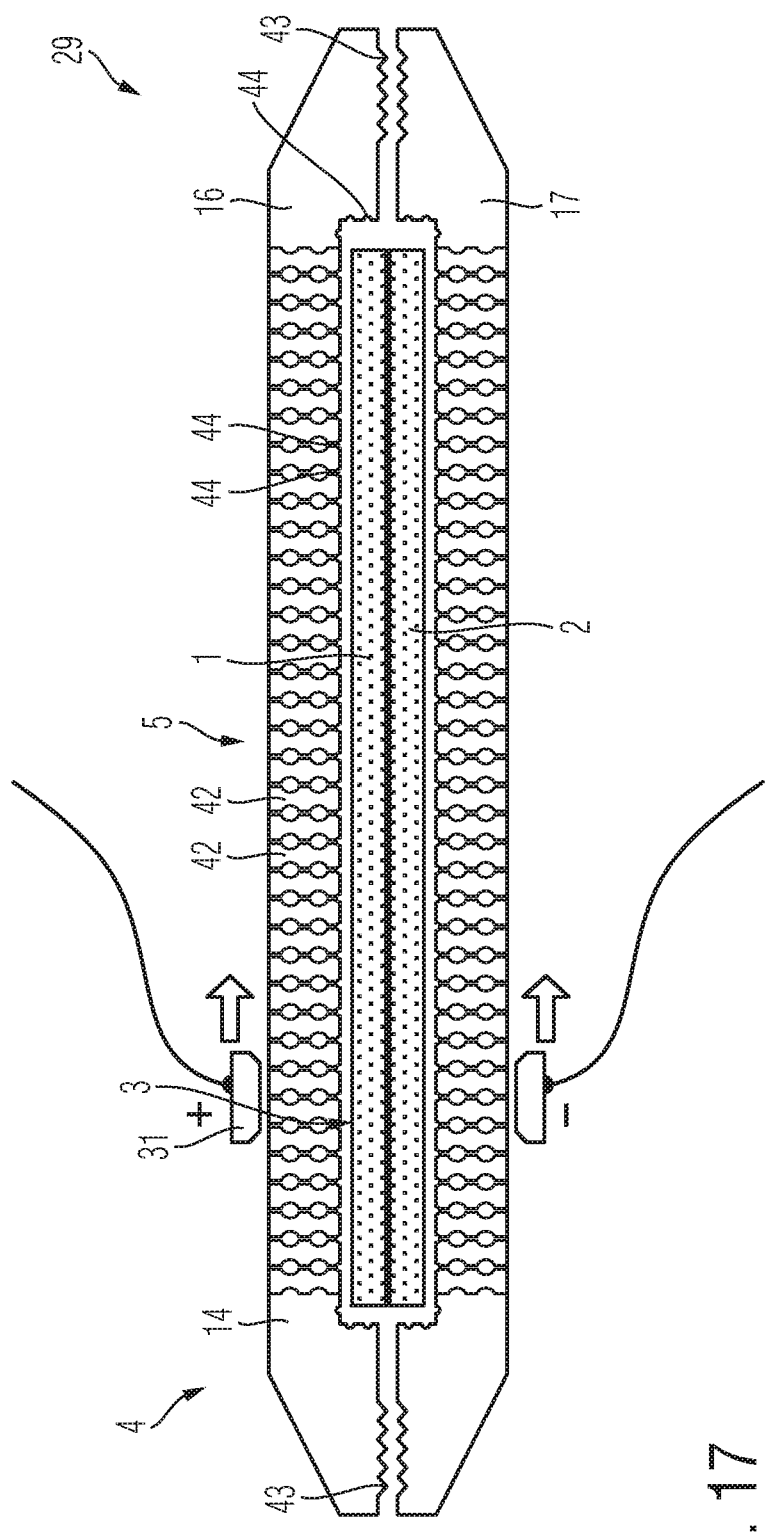
FIG. 17 shows a longitudinal section through the apparatus shown in FIG. 15.

FIG. 17 shows a longitudinal section through the apparatus 29 shown in FIG. 15.

The longitudinal section plane extends along the joining zone 3, along which the welding electrodes of a welding device 31 are guided over the pressurization arrangement 4 in order to weld the fiber composite components 1, 2, as symbolized by the arrows depicted. The welding electrodes are thus brought into contact successively on the outside of the mold 14 with the conductive elements 42 arranged along the joining zone 3, with the result that the elements introduce the welding current into the joining zone 3 at the respective point, depending on the position of the electrodes.

Integrated sealing lips 43 can also be seen in the longitudinal section at the longitudinal ends of the mold 14. The vacuum channels 44 are furthermore also provided at the longitudinal ends of the inner side of the mold 14, which accommodates the fiber composite components 1, 2.

Figure 18:
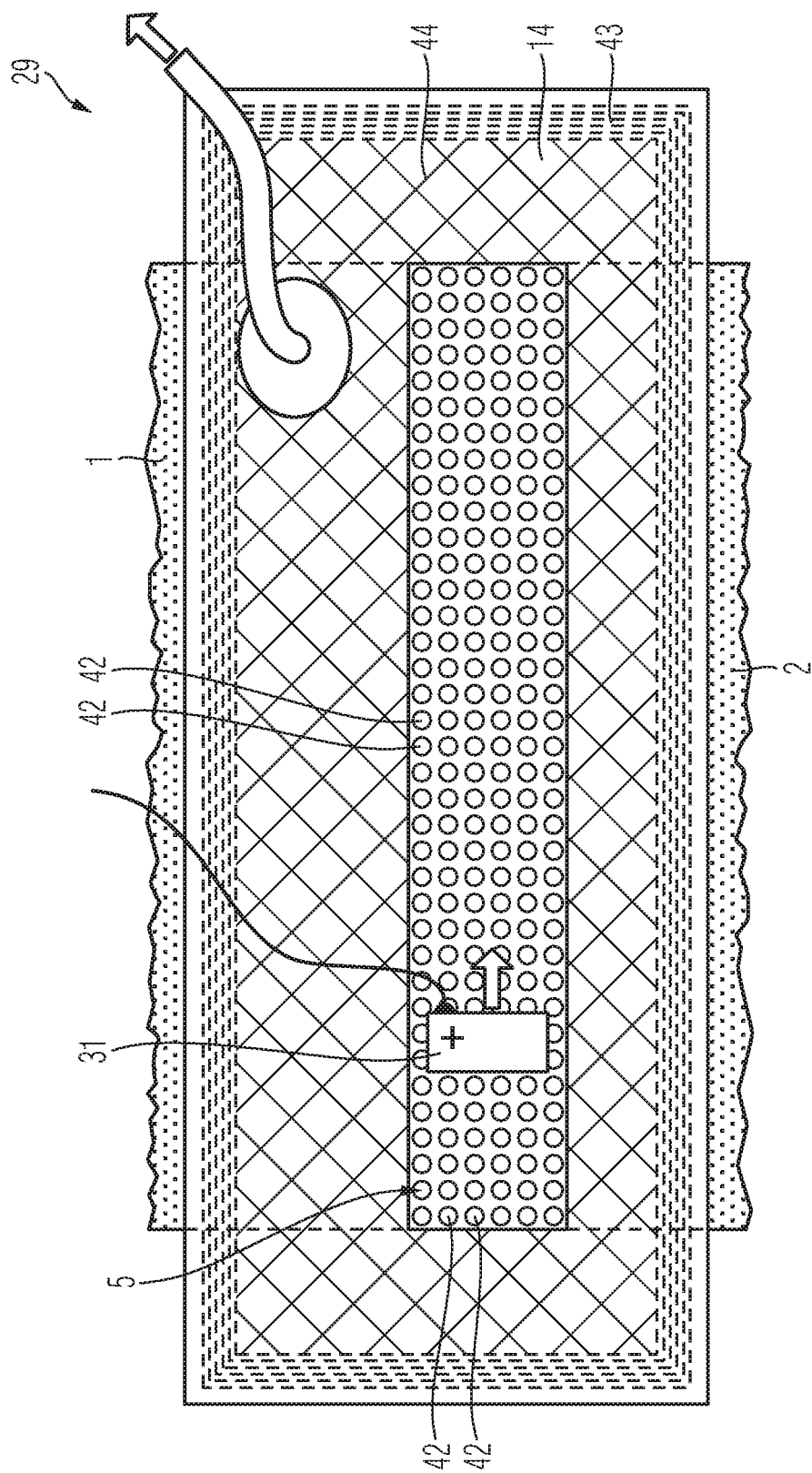
FIG. 18 shows a plan view of the apparatus shown in FIG. 17.

FIG. 18 shows a plan view of the apparatus 29 shown in FIG. 17.

The conductive elements 42 which form electric contacts 5 of the pressurization arrangement 4 are arranged so as to be distributed in a matrix-like or grid-like manner over the joining zone 3. The conductive elements 42 are contacted successively by a longitudinal movement of the welding electrodes of the welding device 31.

In this respect, a grid-like arrangement of the vacuum channels 44 provided on the inner side of the mold 14 is furthermore illustrated schematically in this view. In actual fact, however, the channels 44 are concealed from the outside. The sealing lips 43 running around the circumference of the mold 14 furthermore illustrated schematically, and these are likewise concealed in actual fact.

In other embodiments, the welding energy can also be transmitted to the component surface in the form of ultrasound from a sonotrode via conductive elements 42 in the joining zone 3 which are in the form of metal bars embedded in the mold 14.

Figure 19:
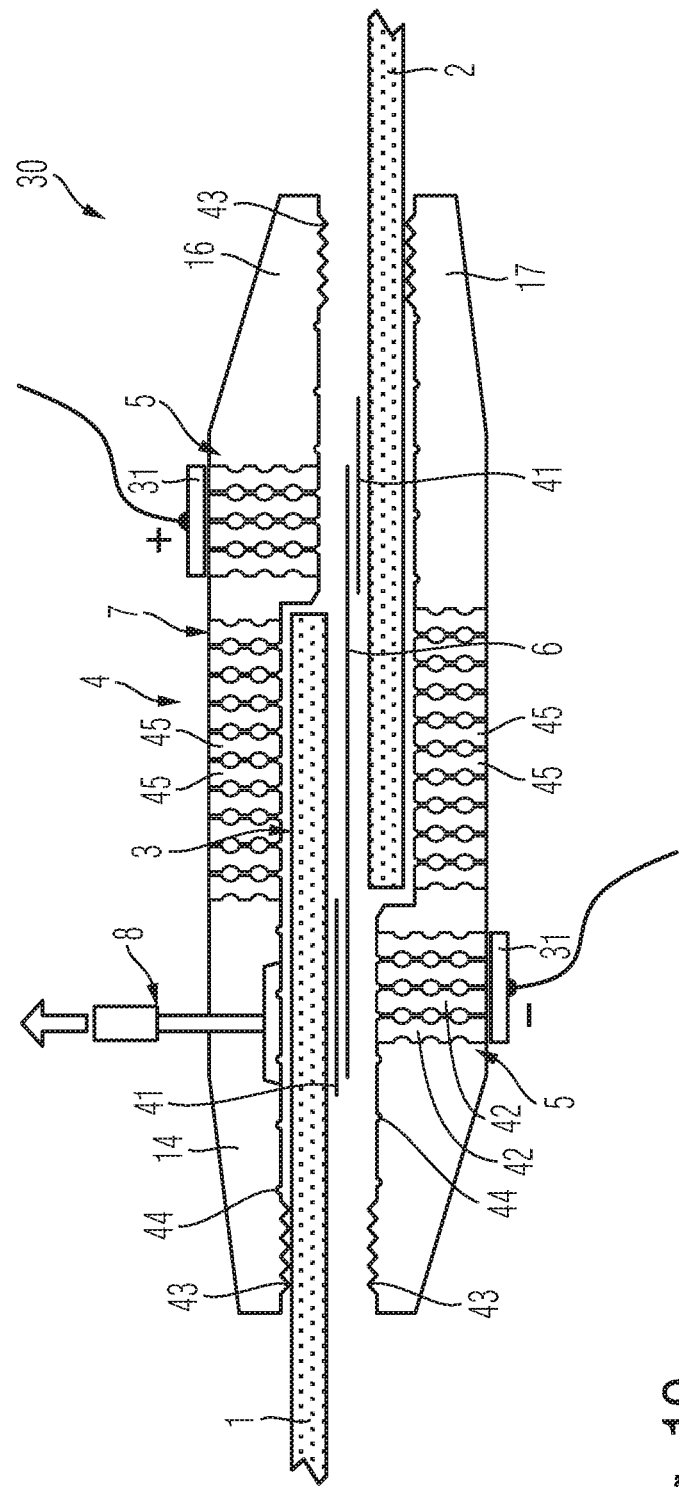
FIG. 19 shows a cross-sectional view of an apparatus for thermally joining thermoplastic fiber composite components according to another embodiment.

FIG. 19 shows a cross-sectional view of an apparatus 30 for thermally joining thermoplastic fiber composite components 1, 2 according to another embodiment.

In this embodiment, a flexible mold 14 is likewise provided as a pressurization arrangement 4. In contrast to the embodiments described above, an additional pressure is applied magnetically in this pressurization arrangement. For this purpose, a magnet arrangement 7 integrated into the mold 14 is provided in the region of the joining zone 3. In this embodiment, pressurization thus comprises the application of magnetic forces.

The magnet arrangement 7 is provided in the region of the joining zone. In the joining zone, the pressurizations by the vacuum arrangement 8 and the magnet arrangement 7 are thus added together.

In the embodiment illustrated, the magnet arrangement is, by way of example, a multiplicity of bar magnets 45 molded into the mold 14, which magnetically compress the mold 14 in the region of the joining zone.

In other embodiments, it would also be conceivable to implement the magnet arrangement 7 by one or more electromagnets.

It is furthermore conceivable to provide the magnet arrangement 7 independently of a vacuum arrangement.

In the embodiment illustrated, in a manner similar to that described with reference to FIG. 13, a welding filler material 6 is inserted in the joining zone between the fiber composite components 1, 2 to be joined. Here, this material is contacted by conductive elements 42, which are arranged laterally with respect to the joining zone, are likewise integrated into the mold 14 and form the electric contacts 5. For this purpose, the conductive elements 42 are arranged in a manner laterally offset next to the joining zone 3. The welding filler material 6 extends through the joining zone 3 into the lateral regions and is contacted there by the conductive elements 42.

By virtue of the overlapping arrangement of the components 1, 2, a first contact 5, which is formed with the conductive elements 42 and is arranged on the right, next to the joining zone 3, in the cross-sectional view illustrated, is provided on the top part 16. A second contact 5, which is formed with conductive elements 42 and is arranged on the left, next to the joining zone, in the cross-sectional view illustrated, is provided in the bottom part 17, on the opposite side of the joining zone 3.

An insulating element 41 for protecting the fiber composite components 1, 2, e.g. in the form of an insulating parting film, is provided in the region of the contacts 5, on a side of the filler material 6 which faces the respective fiber composite component 1, 2.

In a modification of the embodiment illustrated here, it would also be conceivable, when there is no welding filler material in the region of the joining zone, to use the bar magnets 45 extending in the thickness direction through the bottom part and/or the top part simultaneously as electric contacts for conducting a welding current. In this case, the bar magnets 45 would simultaneously be designed as electric contacts 5 for welding the fiber composite components.

Figure 20:
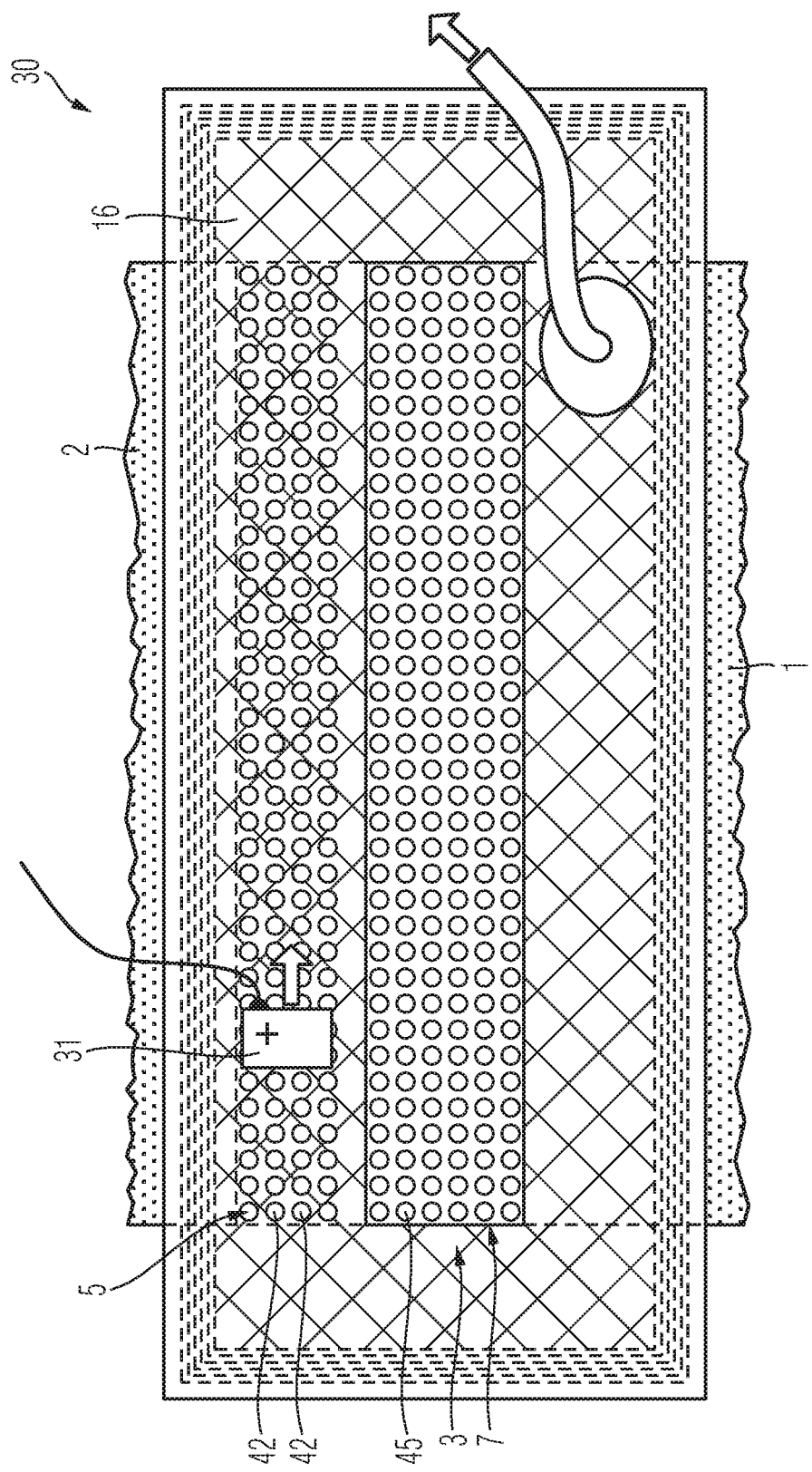
FIG. 20 shows a plan view of the apparatus shown in FIG. 19.

FIG. 20 shows a plan view of the apparatus shown in FIG. 19.

In this view, which shows a plan view of the top part 16, the regular grid-like arrangement of the bar magnets 45 provided in the region of the joining zone 3 can be seen, the arrangement ensuring uniform pressure conditions in the joining zone 3.

The conductive elements 42, which are provided as electric contacts 5, are likewise arranged in a grid-like manner and are arranged laterally offset along the joining zone can furthermore be seen. The welding filler material 6 is thus contacted on the long sides of the joining zone 3. To weld the fiber composite components 1, 2, a welding electrode of the welding device 31 accordingly travels in the longitudinal direction along the electric contacts 5 and, in the process, successively contacts the conductive elements 42, as symbolized by the movement arrow depicted. On the opposite side, a second welding electrode of opposite polarity of the welding device 31 moves in parallel thereto in the same way along the electric contacts 5 of the bottom part 17.

During welding and also following the welding operation, during cooling, the bar magnets 45 of the magnet arrangement 7, which are provided in the top part 16 and in the bottom part 17, keep the joining zone 3 under an additional pressurization supplementary to the applied vacuum.

In other embodiments, it would also be conceivable, instead of a bilateral magnet arrangement, to provide unilateral positioning of magnets on one side and a magnetizable medium on the other side.

In all the embodiments, materials provided in the region of the joining zone, e.g. films, molds or textiles, which are in contact with the material of the fiber composite components which is to be welded are preferably embodied in such a way that, even after the melting and cooling of thermoplastic matrix of the parts to be joined, they can be separated therefrom again. For this purpose, they can be treated with a parting agent, for example. As an alternative or in addition, an embodiment consisting of or comprising a non-adhering material or a corresponding coating is also possible.

Figure 21:
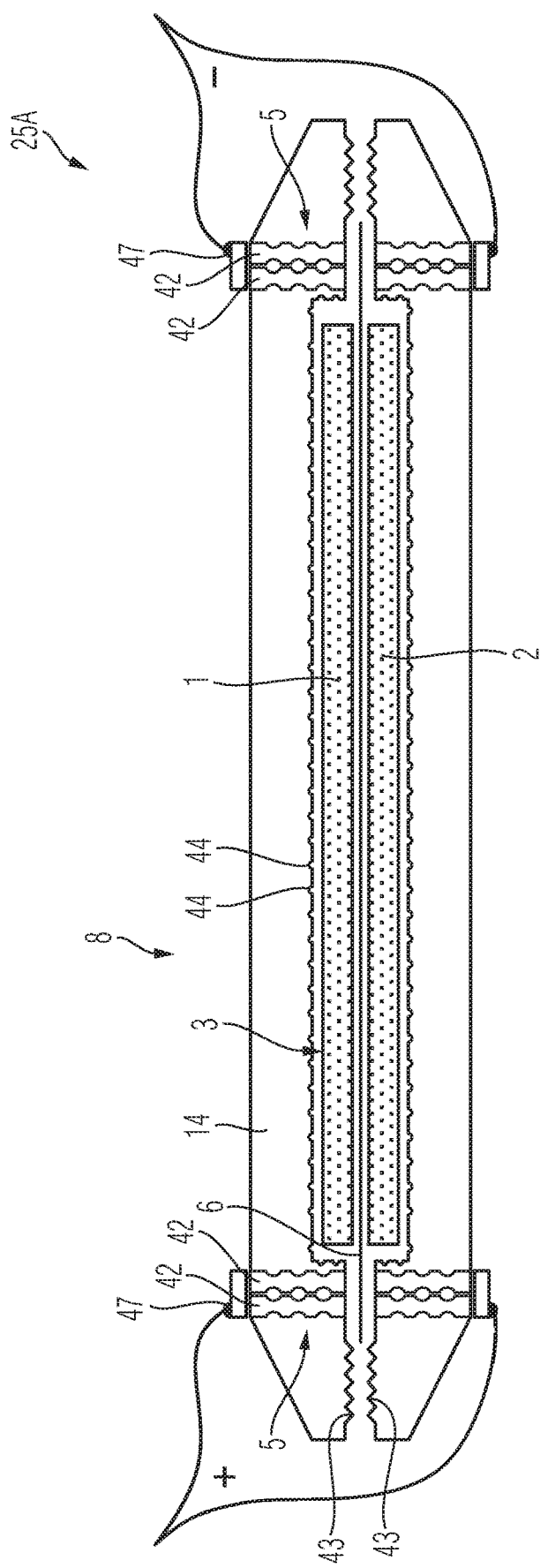
FIG. 21 shows a longitudinal section through an apparatus for thermally joining thermoplastic fiber composite components according to another embodiment.

FIG. 21 shows a longitudinal section through an apparatus 25A for thermally joining thermoplastic fiber composite components 1, 2 according to another embodiment.

This embodiment differs from the embodiment shown in FIGS. 19 and 20 in that the welding filler material 6 is not contacted on the long sides here but on the short sides of the respective longitudinal ends of the joining zone 3. For this purpose, conductive elements 42, which are embedded in the mold 14, are here designed as metal bars and form contacts 5 that contact the welding filler material 6, are provided in the same way as described with reference to FIG. 19. The contacts 5 are coupled to a welding device 47 having fixed electrodes.

In the embodiment illustrated, the contacts 5 and the electrodes of the welding device 47 are provided both on the bottom side and on the top side of the mold 14. In this case, the metal bars can simultaneously be designed as bar magnets. In this way, reliable contacting of the welding filler material 6 between the upper and lower contacts 5 is ensured.

In other embodiments, it is also possible to provide only unilateral contacts 5 for each pole, e.g. only on the top side 16 or the bottom side 17 of the flexible mold 14 or, in the case of a mold 14 that is flexible on only one side, on the top side.

In the embodiment illustrated, the pressurization is provided by a vacuum arrangement 8. A vacuum, which is applied via an air suction nozzle 8 (not visible in the sectional view illustrated), acts uniformly via the channels 44 across the entire joining zone 3, which is sealed off airtightly by the sealing lips 43.

Figure 22:
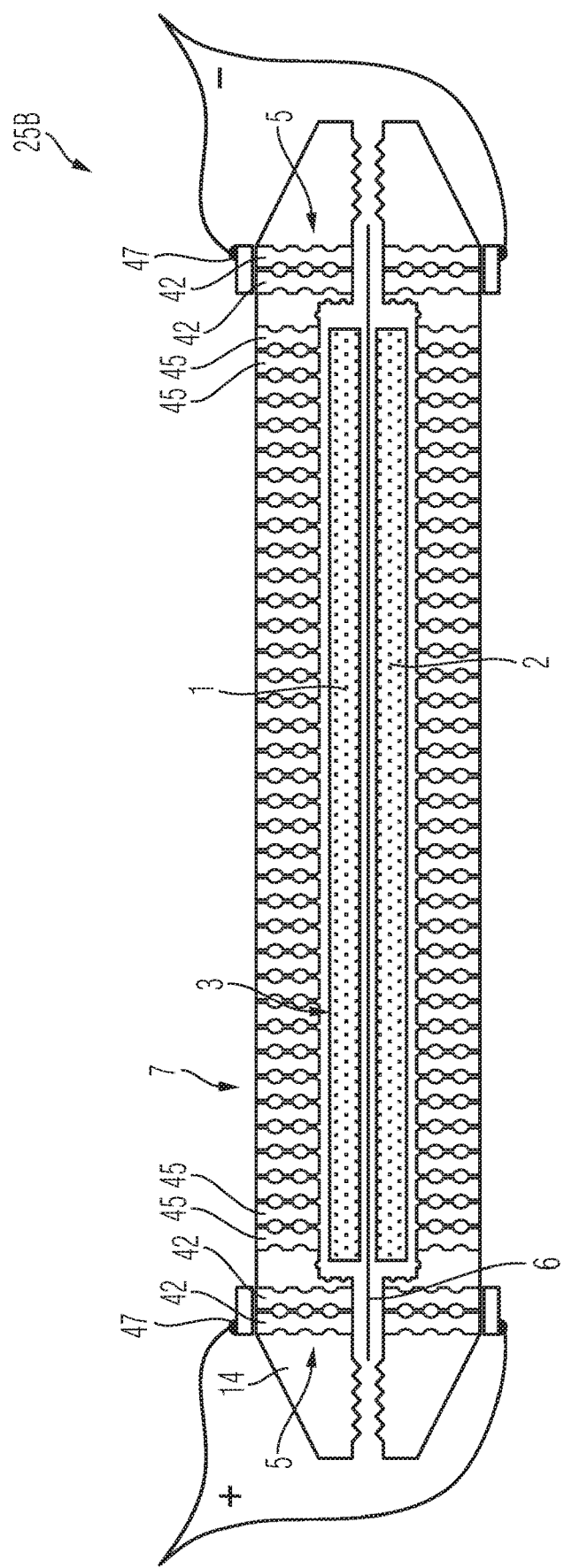
FIG. 22 shows a longitudinal section through a modified apparatus for thermally joining thermoplastic fiber composite components.

FIG. 22 shows a longitudinal section through a modified apparatus 25B for thermally joining thermoplastic fiber composite components.

In this modification, the pressurization arrangement has, in the joining zone 3, a magnet arrangement 7 having a multiplicity of bar magnets 45 distributed along the joining zone 3 and embedded in the mold 14, as explained in greater detail with reference to FIG. 19.

In principle, the magnet arrangement 7 can be provided as an alternative or in addition to a vacuum arrangement 8 shown in FIG. 21. In the embodiment illustrated, the magnet arrangement 7 is provided in addition to the vacuum arrangement 8.

Figure 23:
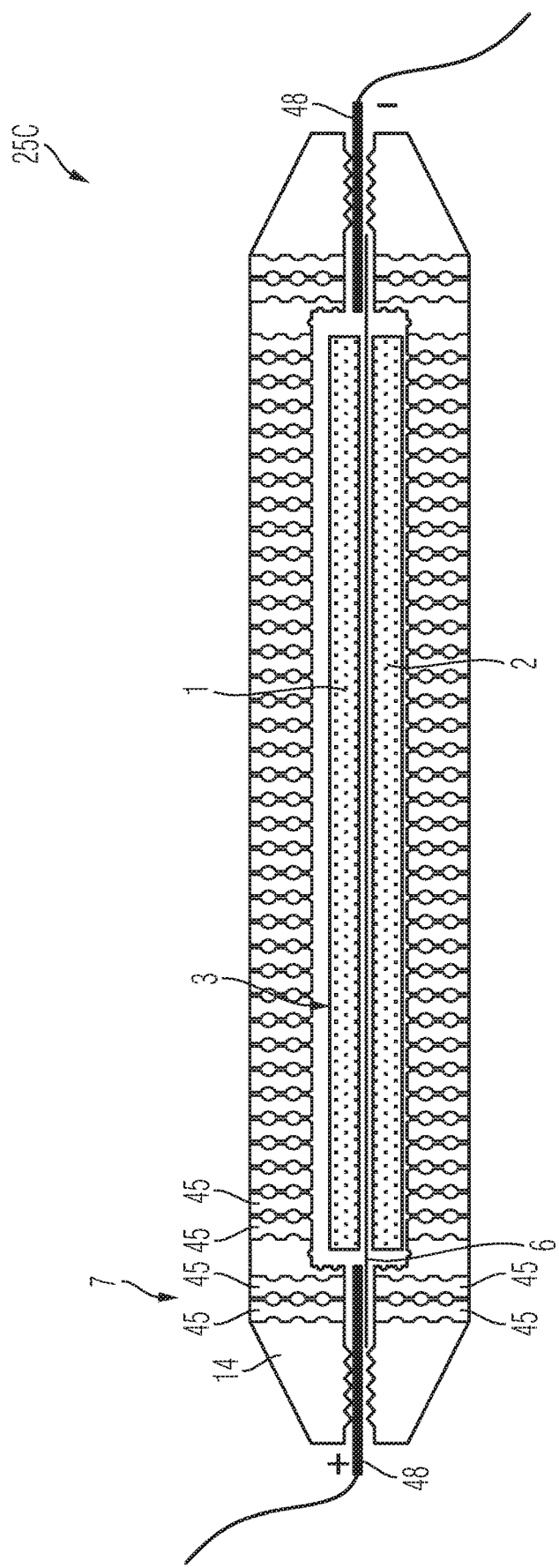
FIG. 23 shows a longitudinal section through another modified apparatus for thermally joining thermoplastic fiber composite components.

FIG. 23 shows a longitudinal section through another modified apparatus 25C for thermally joining thermoplastic fiber composite components.

In this embodiment, a welding device 48 is provided with stationary electrodes which extend into the mold 14 at the level of the joining zone 3, at the longitudinal ends of the joining zone 3, to a point directly adjoining the welding filler material 6. Here, the electrodes are fixed to the magnet arrangement 7 in the mold 14 and are pressed together with the welding filler material 6 for reliable contacting.

The pressurization arrangement 4 thus has the magnet arrangement 7, which in this case once again comprises a multiplicity of bar magnets 45, by way of example. In other embodiments, electromagnets can also be provided as an alternative or in addition to bar magnets.

Here too, in addition, a vacuum arrangement 8 as described with reference to FIG. 21 is also provided. In other embodiments, the magnet arrangement 7 can also be provided without a vacuum arrangement 8.

Figure 24:
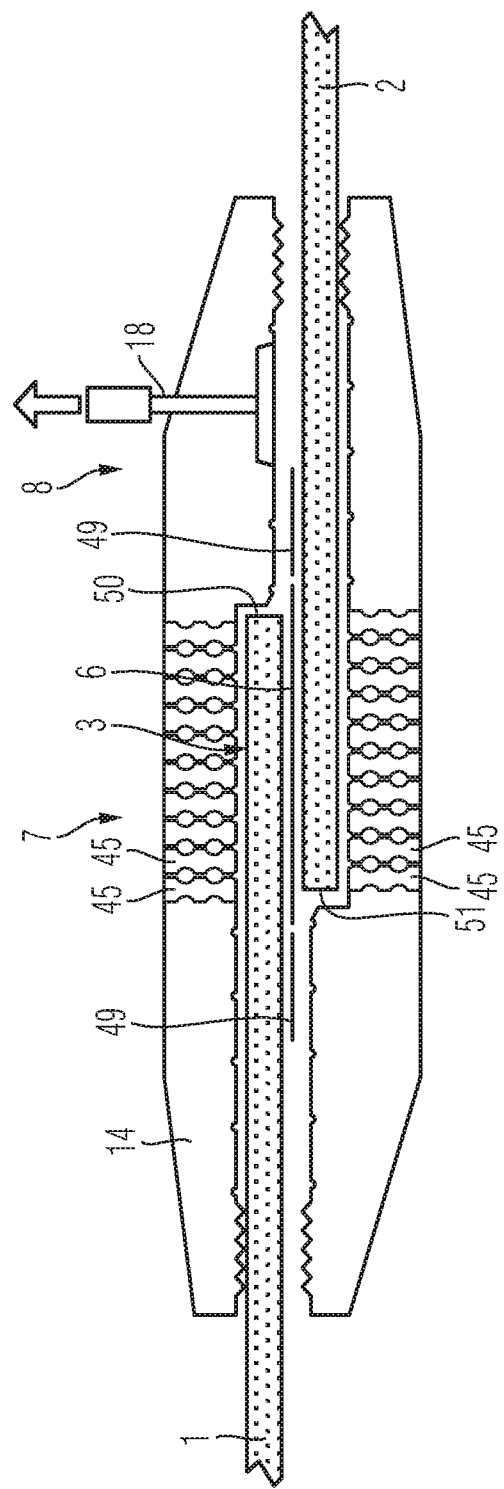
FIG. 24 shows a cross-sectional view of an apparatus shown in FIG. 22 or FIG. 23.

FIG. 24 shows a cross-sectional view of an apparatus shown in FIG. 22 or FIG. 23.

In this illustration, it is possible to see the arrangement of the welding filler material 6 in the overlap between the fiber composite components 1, 2 to be joined. The welding filler material 6 is designed to extend beyond the joining zone 3 or beyond the overlap on the long sides of the joining zone 3. In this way, cooling of the joining zone 3 in the region of the component edges 50, 51 is avoided. Melting of the component edges 50, 51 and complete welding is thus ensured.

Since the component edges 50, 51 also melt, a parting agent 49 is in each case provided adjoining the welding filler material 6 extending beyond the overlap, creating a defined end of the region that has melted beyond the joining zone 3. Here, by way of example, the parting agent 49 is designed as an adhesive tape with a parting coating.

Figure 25:
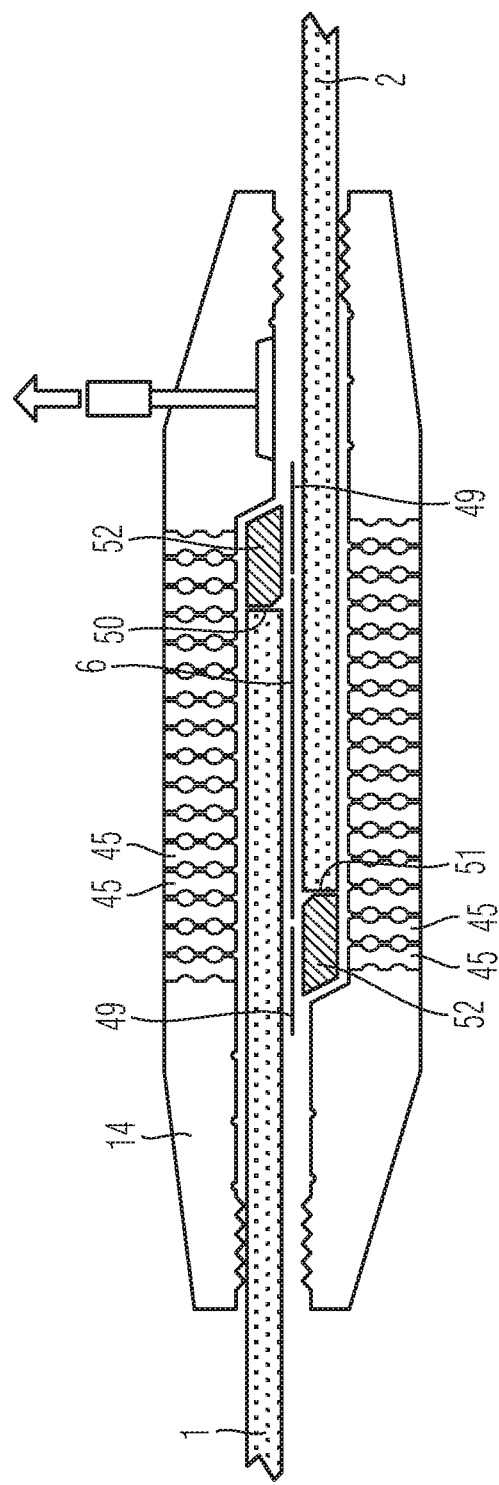
FIG. 25 shows a cross-sectional view of another modified apparatus for thermally joining thermoplastic fiber composite components.

FIG. 25 shows a cross-sectional view of another modified apparatus for thermally joining thermoplastic fiber composite components.

In this embodiment, electrically non-conductive auxiliary inserts 52 are applied directly adjoining the component edges 50, 51, on both sides of the overlapping joint between the fiber composite components 1, 2 and the mold 14, and these are also compressed during the pressurization. Here, the welding filler material 6 is extended partially beyond the auxiliary inserts 52 at the edge of the joining zone 3. Here too, parting agents 49 are provided adjoining the welding filler material 6.

The auxiliary inserts 52 have the same thermal conductivity as the material of the fiber composite components 1, 2, and therefore the heat of welding is transmitted as far as the component edges 50, 51. Thus, the component edges 50, 51 also melt, and a geometry of the weld seam end is defined by the auxiliary inserts 52.

For this purpose, the auxiliary inserts 52 are preferably manufactured from the same material as the fiber composite components and are merely enclosed with a non-conductive film or coating. In this way, a desired complete welding through the component edges 50, 51 with a predefined geometry is made possible.

Figure 26:
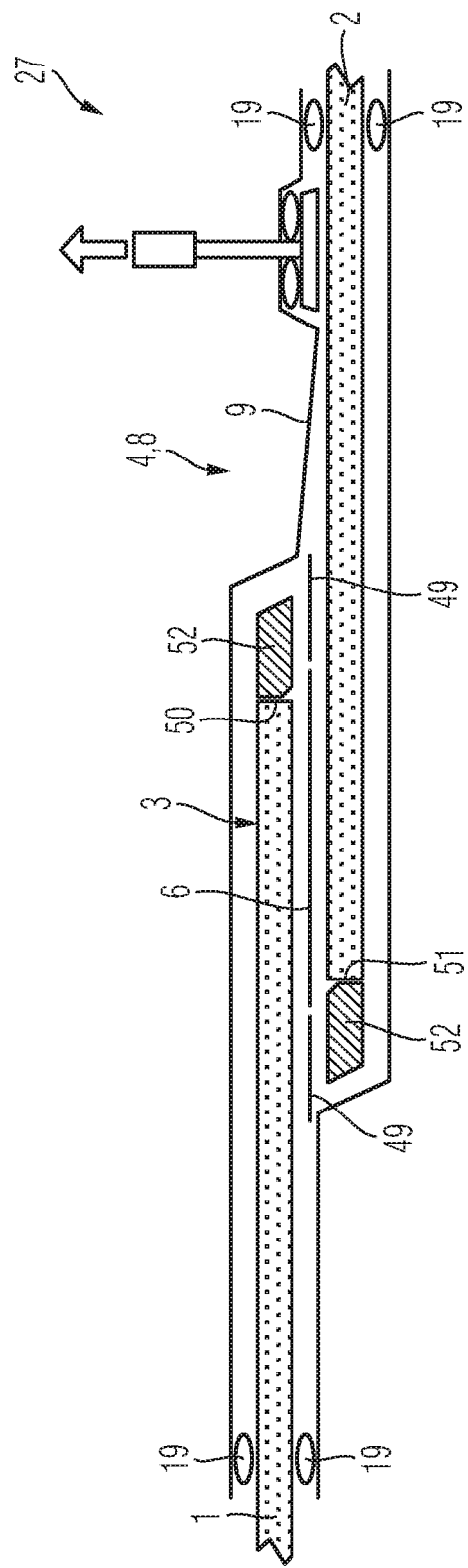
FIG. 26 shows a cross-sectional view of an apparatus for thermally joining thermoplastic fiber composite components according to another embodiment.

FIG. 26 shows a cross-sectional view of an apparatus 27 for thermally joining thermoplastic fiber composite components according to another embodiment.

In this embodiment, in comparison with FIG. 25, the arrangement of the welding filler material 6 and of the auxiliary inserts 52 in the region of the joining zone 3 is the same.

However, the apparatus 27 differs decisively in the type of cover for the pressurization arrangement 4, which is not formed here by a flexible mold 14 but by a vacuum diaphragm 9, as described with reference to FIGS. 12 and 13. In this case, the contacts 5 are provided at the longitudinal ends of the joining zone 3 and can be designed in the manner described with reference to FIG. 12 or 13, for example.

Although the disclosure herein has been described fully above by preferred illustrative embodiments, it is not restricted thereto but can be modified in many different ways.

In particular, the following further embodiments are envisioned and possible:

Possible Embodiment 1

Method for thermal welding of thermoplastic fiber composites, wherein the two mating parts to be connected are surrounded airtightly (or approximately airtightly) by a vacuum structure during the welding operation, at least in the welding zone, wherein air is evacuated from this zone by using a vacuum pump or reduced pressure pump, wherein a vacuum or at least a pressure lower than the ambient pressure prevails there, with the result that the compression of the mating parts required for welding is achieved by the pressure difference between the ambient pressure and the internal pressure in the vacuum structure.

Possible Embodiment 2

Method according to embodiment 1, wherein thermal energy required for welding is introduced by using laser energy or electric induction or ultrasound (see FIG. 9 and FIG. 10).

Possible Embodiment 3

Method according to embodiment 1, wherein thermal energy required for welding is introduced by a current flow through the mating parts themselves (see FIGS. 1 to 8 and 14 to 17) or through a filler material (see FIGS. 11 to 13 and 18, 19).

Possible Embodiment 4

Method according to embodiment 3, wherein, in the region where the current is introduced, the vacuum film used in the remaining region (or other vacuum barrier, e.g. a silicone mold) is replaced locally by an electrically conductive medium (e.g. a metal foil, metal pieces or an electrically conductive, approximately airtight textile), wherein the vacuum film (or vacuum barrier) and the electrically conductive medium (e.g. foil or textile) are connected in such a way (e.g. by an adhesive tape) that the (approximate) vacuum tightness of the vacuum structure continues to be maintained.

Possible Embodiment 5

Method according to embodiment 4, wherein the region provided for the introduction of current is divided into segments composed of electrically conductive medium (e.g. metal pieces, foil or textile), wherein the (metal-piece, foil or textile) segments do not touch directly but are connected (approximately) airtightly by an electrically non-conductive intermediate material, with the result that, although a current can flow from an electrode touching segment in the thickness direction into the material to be welded or into the filler material, the current flow cannot propagate sideways into or across other segments.

Possible Embodiment 6

Airtight or approximately airtight medium (e.g. silicone mold, film or textile), wherein this has a significant electric conductivity only in the thickness direction but has no significant electric conductivity in directions parallel to the surface (e.g. of the silicone mold, of the film or of the textile).

Possible Embodiment 7

Semi-permeable medium (e.g. silicone mold, film or textile), which is permeable to air but is (virtually) impermeable to the partially melted or liquefied matrix material of the mating parts and has a significant electric conductivity only in the thickness direction but no significant electric conductivity in directions parallel to the surface (e.g. of the silicone mold, of the film or of the textile).

Possible Embodiment 8

Mold, film or textile according to embodiment 6 or 7, wherein this is composed of a multi-material mix consisting of or comprising conductive and non-conductive materials, e.g. of metal particles embedded in plastic film, metal bars embedded in silicone or metal threads introduced into a synthetic fiber textile, which touched the two surfaces of the mold, film or textile but touch each other only occasionally or not at all in the direction of the surface. Possible embodiment 9. Method according to embodiment 3, 4 or 5, wherein a mold, a film or an approximately airtight textile according to embodiment 6 or 8 is used for the entire vacuum structure or the local inserts in the vacuum structure (see FIGS. 5, 6 and 7).

Possible Embodiment 10

Method according to one of embodiments 1-5 or 9, wherein the electrodes or the other energy sources for introducing heat during the welding operation are moved along the weld seam.

Possible Embodiment 11

Method according to embodiment 10, wherein, where electrodes are used for energization, the electrodes have rollers or brushes which are optimized for moving contact.

Possible Embodiment 12

Method according to the embodiment 11, wherein an electrically conductive paste is provided to improve contacting between the electrodes and the electrically conductive medium of the vacuum bag.

Possible Embodiment 13

Method according to one of embodiments 1-5 or 9-12, wherein an inner vacuum bag consists of a semi-permeable medium (permeable to air but impermeable to matrix material of the mating parts), if appropriate according to embodiment 7 (in the case of resistance welding according to embodiment 3-5 or 10-12), and an outer vacuum bag consists of a medium which is (virtually) impermeable to air, if appropriate according to embodiment 6 (in the case of resistance welding according to embodiment 3-5 or 10-12).

Possible Embodiment 14

Method for thermal welding of thermoplastic fiber composites, wherein the two mating parts to be connected are compressed by magnetic forces during the welding operation, at least in the welding zone, e.g. by bilateral positioning of mutually attracting magnets or by unilateral positioning of magnets and a magnetizable medium on the other side.

Possible Embodiment 15

Method according to one of embodiments 1-13, combined with a method according to embodiment 14.

Possible Embodiment 16

Method according to one of embodiments 14 or 15, wherein a current flow is introduced through the magnets themselves.

The vacuum structure mentioned in embodiment 1 can either consist of film or textile or of a flexible mold on both sides or can consist of one of these on only one side and of an inflexible mold on the other side.

The use of film structures is more practical for small series and prototypes, while, for series applications involving mold parts that are always the same, the use of a flexible mold produced for this purpose saves more time.

The method can be used for spot welds, but the electrodes are preferably moved in a linear manner along a weld seam. It is advantageous if the compression pressure exerted by the vacuum is maintained even during the cooling phase, after the electrodes have moved on. As an alternative, it can also be used for linear welds by a filler material (see FIGS. 11, 12 and 26), in which the electrodes too are not moved but merely rest on both ends. Here, the vacuum or magnetic welding method has the advantage that the pressure can be applied in a uniformly distributed manner over the entire line without using large, expensive and very accurately fitting molds on both sides.

The films, molds or textiles used, which are in contact with the material to be welded, are preferably embodied in such a way that, even after the melting and cooling of the matrix of the parts to be joined, they can be separated therefrom again. They could be treated with a parting agent, for example, or could be composed of a non-adhesive material.

Embodiment 13 and FIG. 8 describe the use of a semipermeable diaphragm in combination with an outer airtight vacuum bag as a vacuum arrangement. This advantageously makes it easier to extract gases liberated during the welding process. Porosity in the welding zone is thus avoided or reduced. When using resistance welding, both vacuum bags can additionally also be designed to allow the passage of current.

For embodiment 14, both permanent magnets and electromagnets can be used.

The auxiliary inserts 37 shown in the figures (auxiliary welding inserts) make it easier to produce the vacuum arrangement 8 in as much as they prevent the formation of creases in the region of the adhesive tapes in order to facilitate airtight connection. The auxiliary inserts can be formed either from non-conductive material or from conductive material wrapped in non-conductive film or provided with a non-conductive coating.

The auxiliary inserts are composed of a material with a sufficiently high melting temperature, and therefore they do not melt during the welding process. This also applies to the films, molds and textiles used.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS 1 fiber composite component
2 fiber composite component
3 joining zone
4 pressurization arrangement
5 electric contact
5a, 5b, 5c, . . . , 5n contact sections
6 welding filler material
7 magnet arrangement
8 vacuum arrangement
9 vacuum diaphragm
10 laser beam
11 diaphragm
12 second layer
13 first layer
14 mold
15 direction of extent of main surface
16 top part
17 bottom part
18 suction nozzle
19 sealing element
20 apparatus
21 apparatus
22 apparatus
23 apparatus
24A; 24B; 24C apparatus
25A; 25B; 25C apparatus
26A; 26B apparatus
27 apparatus
28 apparatus
29 apparatus
30 apparatus
31 welding device
32 welding device
33 welding device
34 welding device
35 welding device
36 adhesive tape
37 auxiliary inserts
38 region of overlap
39 cooling fluid source
40 cooling fluid
41 insulating element
42 conductive element
43 sealing lip
44 vacuum channel
45 bar magnet
46 welding device
47 welding device
48 welding device
49 parting agent
50 component edge
51 component edge
52 auxiliary inserts

The invention claimed is:

1. A method for thermally joining thermoplastic fiber composite components, comprising:
jointly covering thermoplastic fiber composite components to be joined, at least in a region of a joining zone, with a pressurization arrangement, which is flexible, at least in some section or sections;
extensive pressurization of thermoplastic fiber composite components to be joined by the pressurization arrangement, with a result that the fiber composite components are pressed against one another, at least in the joining zone;
welding the fiber composite components in the joining zone during pressurization; and
maintaining the pressurization by the pressurization arrangement until the joining zone solidifies;
wherein the pressurization arrangement contains electric contacts, and the fiber composite components are welded by resistance welding via the electric contacts;
wherein the electric contacts are arranged along the joining zone and welding is performed continuously or in sections along the joining zone by local application of a welding current to the electrical contacts;
wherein an electric current flow is generated through mating parts of the fiber composite components to be joined in a thickness direction of the fiber composite components;
wherein the pressurization arrangement comprises a vacuum arrangement and pressurization comprises applying a vacuum; and
wherein the vacuum arrangement has a flexible vacuum diaphragm, which covers a top side and/or a bottom side of the fiber composite components to be joined, wherein the joint covering, by the vacuum arrangement, of the fiber composite components to be joined comprises applying at least one electrically conductive element as an electric contact in the joining zone, to which electrically conductive element the vacuum diaphragm is connected in an airtight manner, wherein a plurality of electrically conductive elements is provided as contact sections, which electrically conductive elements are each separated electrically from one another and which electrically conductive elements are connected in an airtight manner.

* * * * *